United States Patent
Wanda

(10) Patent No.: US 7,382,477 B2
(45) Date of Patent: Jun. 3, 2008

(54) INFORMATION PROCESSING APPARATUS CAPABLE OF TRANSFERRING PRINT JOB TO ANOTHER INFORMATION PROCESSING APPARATUS, AND ITS CONTROL METHOD

(75) Inventor: Koichiro Wanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 10/095,027

(22) Filed: Mar. 12, 2002

(65) Prior Publication Data

US 2002/0131069 A1    Sep. 19, 2002

(30) Foreign Application Priority Data

Mar. 19, 2001  (JP)  ............................. 2001-079071

(51) Int. Cl.
*G06F 15/00*    (2006.01)
(52) U.S. Cl. .................. 358/1.15; 358/1.13; 358/1.14; 709/202; 709/245
(58) Field of Classification Search ............... 358/1.14, 358/1.13, 1.15; 719/321; 709/245, 202, 709/203
See application file for complete search history.

(56) References Cited

U.S. PATENT DOCUMENTS

| | | | |
|---|---|---|---|
| 4,839,798 A * | 6/1989 | Eguchi et al. ............... 718/105 |
| 5,907,675 A * | 5/1999 | Aahlad ........................ 709/203 |
| 6,202,080 B1 * | 3/2001 | Lu et al. ..................... 718/105 |
| 6,256,750 B1 | 7/2001 | Takeda ......................... 714/11 |
| 6,452,692 B1 * | 9/2002 | Yacoub ..................... 358/1.15 |
| 6,559,965 B1 * | 5/2003 | Simpson et al. ........... 358/1.15 |
| 6,704,885 B1 * | 3/2004 | Salas-Meza et al. ........... 714/6 |
| 6,724,494 B1 * | 4/2004 | Danknick .................. 358/1.14 |
| 6,874,034 B1 * | 3/2005 | Hertling ..................... 709/245 |
| 2002/0063884 A1 * | 5/2002 | Bhogal et al. ............. 358/1.15 |

* cited by examiner

*Primary Examiner*—Aung S. Moe
*Assistant Examiner*—Vincent Rudolph
(74) *Attorney, Agent, or Firm*—Fitzpatrick, Cella, Harper & Scinto

(57) ABSTRACT

There are disclosed an information processing apparatus and its control method, which can proceed to execute a process of an incomplete print job upon receiving an end process request while an incomplete print job is present. In an information processing apparatus according to this invention, if an incomplete print job is present upon receiving an end process instruction, another information processing apparatus which can alternately process this print job is searched for (S2203), and the incomplete print job is transferred to that information processing apparatus (S2207). Since the information processing apparatus, which received the incomplete print job, processes the received print job as a self spooled print job, the print job can be normally processed.

13 Claims, 29 Drawing Sheets

FIG. 7

| | |
|---|---|
| JOB ID | ~701 |
| PRINTER NAME | ~702 |
| MACHINE NAME | ~703 |
| STATUS | ~704 |
| DOCUMENT NAME | ~705 |
| SIZE | ~706 |
| SPOOL METHOD | ~707 |
| ⋮ | |
| GROUP PRINT DESIGNATION | ~708 |
| GROUP NAME | ~709 |
| INTRA-GROUP PRINT ORDER | ~710 |
| INTRA-GROUP JOB COUNT | ~711 |
| ⋮ | |

FIG. 8

| 801 | 802 | 803 | 804 |
|---|---|---|---|
| CLIENT NAME | GROUP NAME (ID) | PRINT ORDER | TOTAL JOB COUNT OF GROUP |

FIG. 16

GP-INFO

| |
|---|
| GROUP NAME |
| TOTAL JOB COUNT |
| PRINT DESTINATION PRINTER NAME |
| PRINTER STATUS |
| ALTERNATE PRINTER NAME |
| ⋮ |
| JOB ID |
| 1 (PRINT ORDER) |
| STATUS |
| CLIENT NAME |
| ⋮ |
| JOB ID |
| 2 (PRINT ORDER) |
| STATUS |
| CLIENT NAME |
| ⋮ |

GROUP JOB MANAGEMENT TABLE

STORAGE MEDIUM SUCH AS FD/CD-ROM OR THE LIKE

| DIRECTORY INFORMATION |
|---|
| FIRST DATA PROCESSING PROGRAM<br>PROGRAM CODE GROUP CORRESPONDING TO STEPS OF FLOW CHART SHOWN IN FIG.10 |
| SECOND DATA PROCESSING PROGRAM<br>PROGRAM CODE GROUP CORRESPONDING TO STEPS OF FLOW CHART SHOWN IN FIG.11 |
| THIRD DATA PROCESSING PROGRAM<br>PROGRAM CODE GROUP CORRESPONDING TO STEPS OF FLOW CHART SHOWN IN FIG.12 |
| FOURTH DATA PROCESSING PROGRAM<br>PROGRAM CODE GROUP CORRESPONDING TO STEPS OF FLOW CHART SHOWN IN FIG.13 |
| FIFTH DATA PROCESSING PROGRAM<br>PROGRAM CODE GROUP CORRESPONDING TO STEPS OF FLOW CHART SHOWN IN FIG.14 |
| SIXTH DATA PROCESSING PROGRAM<br>PROGRAM CODE GROUP CORRESPONDING TO STEPS OF FLOW CHART SHOWN IN FIG.15 |
| SEVENTH DATA PROCESSING PROGRAM<br>PROGRAM CODE GROUP CORRESPONDING TO STEPS OF FLOW CHART SHOWN IN FIG.22 |
| EIGHTH DATA PROCESSING PROGRAM<br>PROGRAM CODE GROUP CORRESPONDING TO STEPS OF FLOW CHART SHOWN IN FIG.23 |
| NINTH DATA PROCESSING PROGRAM<br>PROGRAM CODE GROUP CORRESPONDING TO STEPS OF FLOW CHART SHOWN IN FIG.25 |
| 10TH DATA PROCESSING PROGRAM<br>PROGRAM CODE GROUP CORRESPONDING TO STEPS OF FLOW CHART SHOWN IN FIG.26 |
| 11TH DATA PROCESSING PROGRAM<br>PROGRAM CODE GROUP CORRESPONDING TO STEPS OF FLOW CHART SHOWN IN FIG.27 |
| 12TH DATA PROCESSING PROGRAM<br>PROGRAM CODE GROUP CORRESPONDING TO STEPS OF FLOW CHART SHOWN IN FIG.28 |
| 13TH DATA PROCESSING PROGRAM<br>PROGRAM CODE GROUP CORRESPONDING TO STEPS OF FLOW CHART SHOWN IN FIG.29 |

MEMORY MAP OF STORAGE MEDIUM

INFORMATION PROCESSING APPARATUS CAPABLE OF TRANSFERRING PRINT JOB TO ANOTHER INFORMATION PROCESSING APPARATUS, AND ITS CONTROL METHOD

FIELD OF THE INVENTION

The present invention relates to an information processing apparatus capable of transferring a print job to another information processing apparatus and its control method and, more particularly, to an information processing apparatus capable of executing a continuous process of a non-processed print job at the time of an end process, and its control method.

The present invention also relates to an information processing apparatus capable of taking over and processing a print job received from another information processing apparatus, and its control method.

The present invention further relates to an information processing apparatus for managing a print job request from another information processing apparatus and its control method and, more particularly, to an information processing apparatus which can cope with a change in request source of a print job, and its control method.

BACKGROUND OF THE INVENTION

Conventionally, in a print system to which an information processing apparatus of this type can be applied, a printer, client computers (PCs), server computer, and the like can communicate with each other via a predetermined communication medium, and print jobs received in accordance with job processing requests from the respective client computers are stored in a job spooler in the order they are received, and are interpreted in turn to print using the printer.

In a recent print system, the job names of print jobs spooled in a server can be displayed on a client. Using network utility software installed on the client, a print job is designated, the print process of the designated print job can be suspended or canceled according to the authority of the client, and order control can also be made.

Recent software which runs on the client holds print jobs in a PDL format generated by a printer driver without sending their print requests to a print server, and sends a plurality of print jobs together to the print server as a print result, thus implementing a combined print process.

However, when an end process such as a shut-down process or the like of the client or print server is executed while a job whose process is not completed is spooled, the information processing apparatus which forms the conventional print system deletes such job or re-registers it upon restarting the client or print server after the end process, and cannot proceed to execute the print process. Also, the conventional utility software can make order control of print jobs spooled in the server (print server) but cannot control a print process of a group job by grouping a plurality of jobs so as to prevent another print job from interrupting the group job.

In order to reduce the load on the network or print server, a client may send only a print request and job information to the print server, the print server may manage the order control, and the print job itself may be spooled by the client as the print request source. However, a plurality of jobs, which are separately spooled in the print server and clients so as to output them to an identical printer from a plurality of different clients cannot undergo a print process together, or the processing order of jobs spooled in clients in a given group cannot be designated from another client.

Upon grouping print jobs, all print jobs to be grouped are not always ready. Also, the user who uses the client computer does not always immediately issue a print request of a print job in the next print order from the client computer, and a print request may be issued after an elapse of a long period of time when the user is away from his or her desk. In such case, since a print process cannot be started before all grouped print jobs are ready to print, i.e., print jobs are ready to be sent to the printer, print jobs spooled in a server spooler in the print server and client spoolers in respective clients must stand by in that state. However, in a conventional print queue, since a print job whose print request has been issued must be ready to print, a print job must be sent to the printer when a turn to print that print job in the print queue comes.

The conventional software, which implements a combined print process, can execute a combined print process of print jobs from a single client, but cannot form a group of print jobs generated by a plurality of clients.

Furthermore, since the conventional system does not consider any group print process, an end message is sent to a client as the request source upon completion of output of each print job. For this reason, an end message cannot be sent after the print processing states of all jobs that have undergone print processes in a given group are confirmed, and it is confirmed if a series of print processes have ended normally.

When a print process has failed due to a printer error or the like before the end of print processes of all jobs in a group is confirmed, if a client is not informed of all jobs in the group, the user or server as the print request source cannot change a print destination, and cannot take quick and flexible measures against such error. As a result, the suspended group print process cannot be resumed, and a desired print processing result cannot be quickly obtained.

Some recent print system considers a change in print destination of a single print job, but does not consider a change in print destination of the aforementioned grouping job. For this reason, even when the print destination of a single print job has been changed, the paper output face need not be considered as long as an identical PDL is used. This is because the print job is internally spooled, and can undergo a print process by reversing the order of pages by the function of the printer itself. However, the function of the printer itself can cover only a single job, but cannot cover the grouping job, which is considered in the present invention.

SUMMARY OF THE INVENTION

The present invention has been made to solve the aforementioned problems, and has as its first object to achieve print control which can prevent a normal print job from interrupting the print process of grouped print jobs in a single printer, when a plurality of print jobs, print requests of which have been issued from a plurality of clients, are grouped to execute a combined print process, and even when the normal print job is also spooled in a print server.

It is the second object of the present invention to confirm the combined print and paper output results of print jobs, print processes of which are complete, and to send a combined print message to host computers of respective print jobs, even when only a print confirmation message of each print job is acquired from a printer.

It is the third object of the present invention to change the print destination of print jobs to another printer together when a printer error has occurred before the combined print and paper output processes of print jobs.

It is the fourth object of the present invention to provide a mechanism that can maintain a correct print order of a grouping job since a printer processes print jobs in the order they were received, even when the print destination has been changed to a printer with a different paper output face.

It is the fifth object of the present invention to provide a mechanism that allows a client to designate a grouping job process that groups print jobs from a plurality of clients to execute a combined print process, upon issuing a print request.

It is the sixth object of the present invention to provide an information processing apparatus which can proceed to execute a print process by transferring an incomplete print job to another information processing apparatus when an end instruction is issued while the incomplete print job is present, and its control method.

It is the seventh object of the present invention to provide a print system, which can group print jobs from a plurality of clients and can execute print control of the grouped print jobs, and which can proceed to execute processes of all grouped print jobs even when some of information processing apparatuses that requested the grouped print job quit their operations.

In order to achieve any one of the objects, an information processing apparatus according to the present invention comprising, incomplete job detection means for, when an operation end process is requested, detecting if an incomplete print job, a process of which is not completed yet, is present in said apparatus, alternate apparatus determination means for, when the incomplete print job is detected, determining another information processing apparatus which can alternately process that incomplete print job, transfer means for transferring the incomplete print job to the other information processing apparatus which can alternately process that incomplete print job, and end means for executing the operation end process after completion of transfer.

According to the present invention, a method of controlling an information processing apparatus, comprising, the incomplete job detection step of detecting, when an operation end process is requested, if an incomplete print job, a process of which is not completed yet, is present in the apparatus, the alternate apparatus determination step of determining, when the incomplete print job is detected, another information processing apparatus which can alternately process that incomplete print job, the transfer step of transferring the incomplete print job to the other detected information processing apparatus, and the end step of executing the operation end process after completion of transfer.

According to the present invention, a computer program product which implements a method of controlling an information processing apparatus, said computer program comprising, an incomplete job detection program module for, when an operation end process is requested, detecting if an incomplete print job, a process of which is not completed yet, is present in the apparatus, an alternate apparatus determination program module for, when the incomplete print job is detected, determining another information processing apparatus which can alternately process that incomplete print job, a transfer program module for transferring the incomplete print job to the other detected information processing apparatus, and an end program module for executing the operation end process after completion of transfer.

According to the present invention, a computer readable storage medium which stores a computer program which implements a method of controlling an information processing apparatus, said computer program comprising, an incomplete job detection program module for, when an operation end process is requested, detecting if an incomplete print job, a process of which is not completed yet, is present in the apparatus, an alternate apparatus determination program module for, when the incomplete print job is detected, determining another information processing apparatus which can alternately process that incomplete print job, a transfer program module for transferring the incomplete print job to the other detected information processing apparatus, and an end program module for executing the operation end process after completion of transfer.

According to the present invention, an information processing apparatus comprising, reception means for receiving a non-processed print job, which is transferred from another information processing apparatus that is connected to said apparatus to be able to communicate with each other, at a timing different from a print request, order control means for controlling a print order of a print apparatus on the basis of the print request, and processing means for sending the non-processed print job received at the timing different from the print request as a self spooled print job.

According to the present invention, an information processing apparatus comprising, reception means for receiving a non-processed print job which is transferred from another information processing apparatus that is connected to said apparatus to be able to communicate with each other, detection means for detecting reception of print permission information sent from an information apparatus different from the other information processing apparatus, and processing means for sending the received non-processed print job as a self spooled print job in response to reception of the print permission information.

According to the present invention, a method of controlling an information processing apparatus, comprising, the reception step of receiving a non-processed print job, which is transferred from another information processing apparatus that is connected to the apparatus to be able to communicate with each other, at a timing different from a print request, the order control step of controlling a print order of a print apparatus on the basis of the print request, and the processing step of sending the non-processed print job received at the timing different from the print request as a self spooled print job.

According to the present invention, a method of controlling an information processing apparatus, comprising, the reception step of receiving a non-processed print job which is transferred from another information processing apparatus that is connected to the apparatus to be able to communicate with each other, the detection step of detecting reception of print permission information sent from an information apparatus different from the other information processing apparatus, and the processing step of sending the received non-processed print job as a self spooled print job in response to reception of the print permission information.

According to the present invention, a computer program product that implements a method of controlling an information processing apparatus, said computer program comprising, a reception program module for receiving a non-processed print job, which is transferred from another information processing apparatus that is connected to the apparatus to be able to communicate with each other, at a timing different from a print request, an order control program module for controlling a print order of a print apparatus on the basis of the print request, and a processing program module for sending the non-processed print job received at the timing different from the print request as a self spooled print job.

According to the present invention, a computer program product that implements a method of controlling an information processing apparatus, said computer program comprising, a reception program module for receiving a non-processed print job which is transferred from another information processing apparatus that is connected to the apparatus to be able to communicate with each other, a detection program module for detecting reception of print permission information sent from an information apparatus different from the other information processing apparatus, and a processing program module for sending the received non-processed print job as a self spooled print job in response to reception of the print permission information.

According to the present invention, a computer readable storage medium that stores a computer program that implements a method of controlling an information processing apparatus, said computer program comprising, a reception program module for receiving a non-processed print job, which is transferred from another information processing apparatus that is connected to the apparatus to be able to communicate with each other, at a timing different from a print request, an order control program module for controlling a print order of a print apparatus on the basis of the print request, and a processing program module for sending the non-processed print job received at the timing different from the print request as a self spooled print job.

According to the present invention, a computer readable storage medium that stores a computer program that implements a method of controlling an information processing apparatus, said computer program comprising, a reception program module for receiving a non-processed print job which is transferred from another information processing apparatus that is connected to the apparatus to be able to communicate with each other, a detection program module for detecting reception of print permission information sent from an information apparatus different from the other information processing apparatus, and a processing program module for sending the received non-processed print job as a self spooled print job in response to reception of the print permission information.

According to the present invention, an information processing apparatus comprising print job management means for managing print job requests from another information processing apparatus which is connected to said apparatus to be able to communicate with each other, and processing print jobs in a predetermined order using a print apparatus which is connected to said apparatus to be able to communicate with each other, wherein when a request source of the print job requests is changed, said print job management means changes management information of print jobs, the request source of which has been changed, to information corresponding to a new request source.

According to the present invention, a method of controlling an information processing apparatus, which comprises the print job management step of managing print job requests from another information processing apparatus which is connected to the apparatus to be able to communicate with each other, and processing print jobs in a predetermined order using a print apparatus which is connected to the apparatus to be able to communicate with each other, wherein the print job management step includes the step of changing, when a request source of the print job requests is changed, management information of print jobs, the request source of which has been changed, to information corresponding to a new request source.

According to the present invention, a computer program product that implements a method of controlling an information processing apparatus, said computer program comprising, a print job management program module for managing print job requests from another information processing apparatus which is connected to the apparatus to be able to communicate with each other, and processing print jobs in a predetermined order using a print apparatus which is connected to the apparatus to be able to communicate with each other, wherein said print job management program module includes a program module for, when a request source of the print job requests is changed, changing management information of print jobs, the request source of which has been changed, to information corresponding to a new request source.

According to the present invention, a computer readable storage medium that stores a computer program that implements a method of controlling an information processing apparatus, said computer program comprising, a print job management program module for managing print job requests from another information processing apparatus which is connected to the apparatus to be able to communicate with each other, and processing print jobs in a predetermined order using a print apparatus which is connected to the apparatus to be able to communicate with each other, wherein said print job management program module includes a program module for, when a request source of the print job requests is changed, changing management information of print jobs, the request source of which has been changed, to information corresponding to a new request source.

According to the present invention, a print system which is built by connecting first, second, and third information processing apparatuses to be able to communicate with each other, said first information processing apparatus comprising, incomplete job detection means for, when an operation end process is requested, detecting if an incomplete print job, a process of which is not completed yet, is present in said apparatus, alternate apparatus determination means for, when the incomplete print job is detected, determining another information processing apparatus which can alternately process that incomplete print job, transfer means for transferring the incomplete print job to the other information processing apparatus which can alternately process that incomplete print job, and end means for executing the operation end process after completion of transfer, said second information processing apparatus comprising, reception means for receiving a non-processed print job, which is transferred from another information processing apparatus that is connected to said apparatus to be able to communicate with each other, at a timing different from a print request, order control means for controlling a print order of a print apparatus on the basis of the print request, and processing means for sending the non-processed print job received at the timing different from the print request as a self spooled print job, and said third information processing apparatus comprising print job management means for managing print job requests from another information processing apparatus which is connected to said apparatus to be able to communicate with each other, and processing print jobs in a predetermined order using a print apparatus which is connected to said apparatus to be able to communicate with each other, wherein when a request source of the print job requests is changed, said print job management means changes management information of print jobs, the request source of which has been changed, to information corresponding to a new request source.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of the data structure of job information which is common to a client and server shown in FIG. 6;

FIG. 8 shows an example of group designation information managed by a client machine shown in FIG. 6;

FIG. 16 shows an example of the data structure of group print information generated by a server machine shown in FIG. 6;

FIG. 19 shows an example of a graphical user interface window which is provided by a printer driver and is used to make a print setup;

FIG. 20 is a view for explaining the memory map of a storage medium, which stores various data processing programs, that can be read out by a print system to which the information processing apparatus according to the present invention can be applied;

DETAILED DESCRIPTION OF THE PREFERRED EMBODIMENTS

Preferred embodiments of the present invention will now be described in detail in accordance with the accompanying drawings.

First Embodiment

Figure 1:
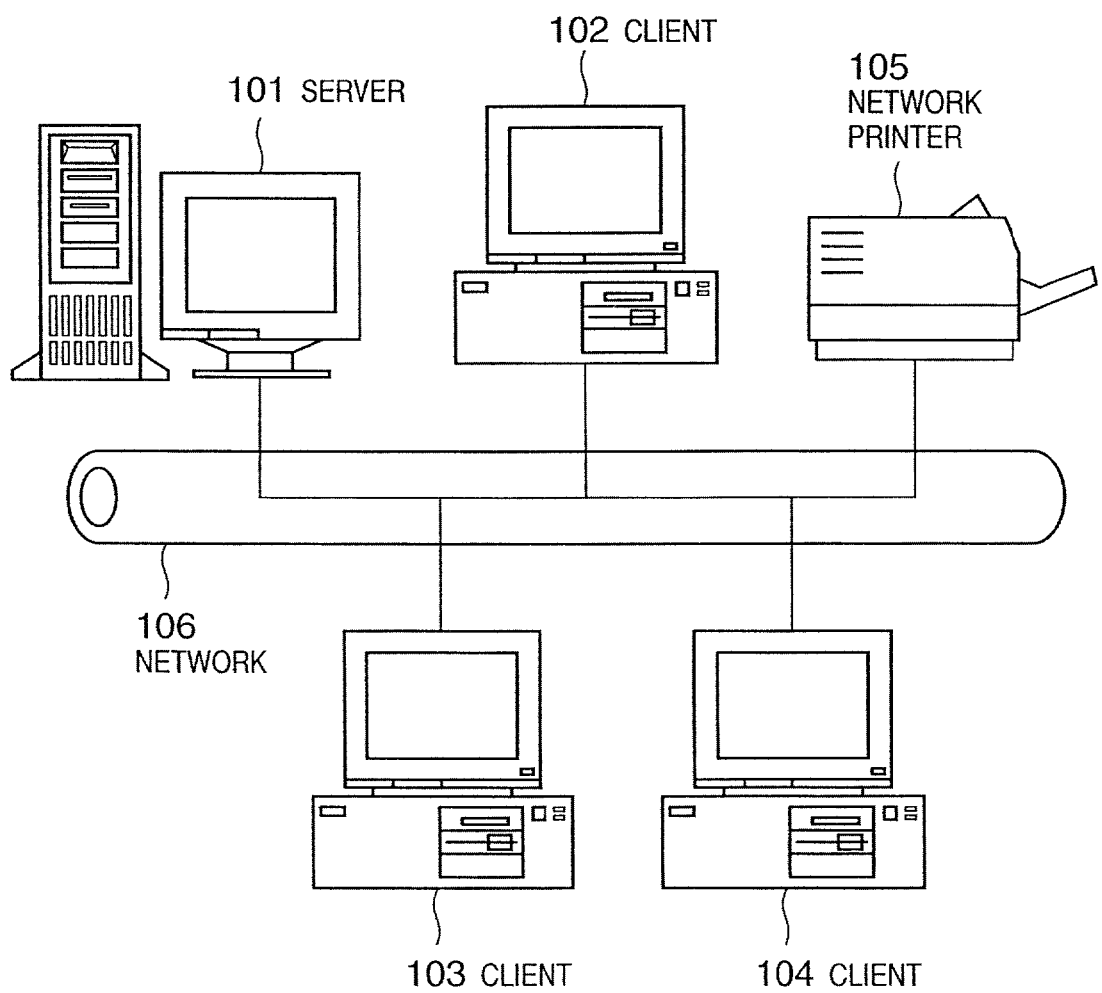
FIG. 1 is a block diagram for explaining the arrangement of an information processing system to which the present invention can be applied.

FIG. 1 is a block diagram for explaining the arrangement of an information processing system to which the present invention can be applied. Assume that n client computers are connected to this system.

Referring to FIG. 1, reference numerals 102, 103, and 104 denote information processing apparatuses which serve as client computers (clients). The clients are connected to a network 106 via a network cable of, e.g., Ethernet, can execute various programs such as application programs and the like, and are installed with a printer driver having a function of converting print data into a printer language corresponding to a printer. Note that the printer driver supports a plurality of printer drivers.

Reference numeral 101 denotes an information processing apparatus which serves as a server (to be referred to as a print server hereinafter) of the present invention. The print server is connected to the network 106 via a network cable, and stores files used on the network, and monitors the use state of the network 106. The print server 101 manages a plurality of printers connected to the network 106.

As for an arrangement, the clients 102 to 104 and print server 101 are general information processing apparatuses, and respectively executably store print control programs which implement different kinds of control.

The print server 101 in this embodiment also has a function of storing print jobs that contain print data, which correspond to print requests issued by the client computers 102, 103, and 104, and executing their print processes, or of receiving job information that does not contain any print data from the client computers 102, 103, and 104, managing the print order of the client computers 102, 103, and 104, and sending a clear to send message of a print job that contains print data to the client computer in its print turn, and of acquiring various kinds of information such as status and print jobs of a network printer 105, and informing the client computers 102, 103, and 104 of such information.

Reference numeral 105 denotes a network printer which serves as a print control apparatus. The network printer 105 is connected to the network 106 via a network interface (not shown), interprets a print job, which is sent from the client computer and contains print data, to convert it into dot images page by page, and prints respective pages of dot images. Reference numeral 106 denotes a network which interconnects the client computers 102, 103, and 104, the server 101, the network printer 105, and the like.

Figure 2:
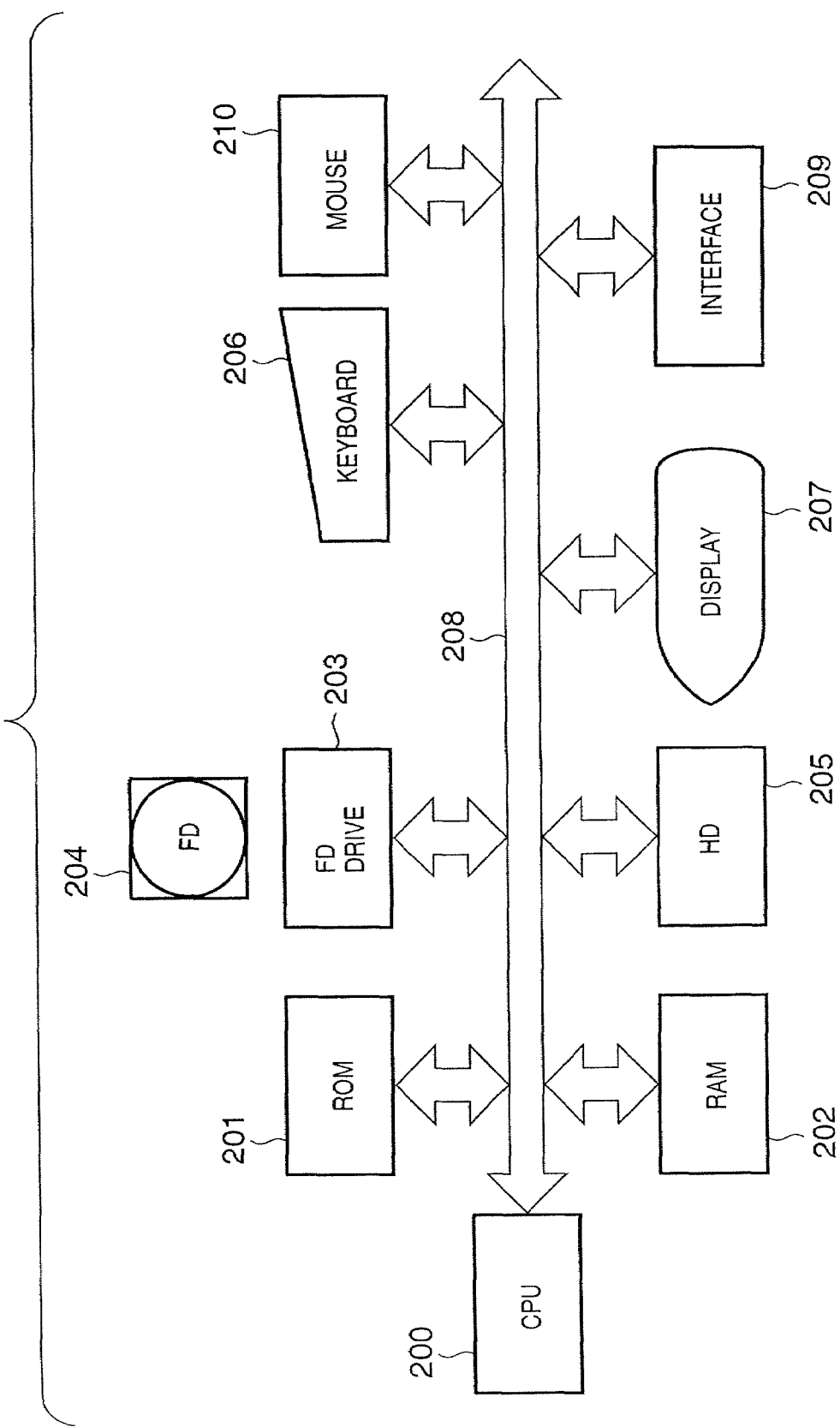
FIG. 2 is a block diagram for explaining the arrangement of an information processing apparatus according to the first embodiment of the present invention.

FIG. 2 is a block diagram for explaining the arrangement of the information processing apparatus of the present invention. The client computers 102, 103, and 104 as the information processing apparatuses have the same arrangement, and the server 101 also has the same or equivalent hardware arrangement. Hence, FIG. 2 will be explained as a block diagram that explains the arrangement of the client and server.

Referring to FIG. 2, reference numeral 200 denotes a CPU as control means of the information processing apparatus. The CPU 200 makes control to execute application programs, a printer driver program, an OS, a network printer control program of the present invention, and the like, which are stored in a hard disk (HD) 205, and to temporarily store information, files, and the like required to execute programs in a RAM 202.

Reference numeral 201 denotes a ROM as storage means, which stores programs such as a basic I/O program, and the like, and various data such as font data, template data, and the like used in a document process. Reference numeral 202 denotes a RAM as temporary storage means, which serves as a main memory, work area, and the like of the CPU 200.

Figure 5:
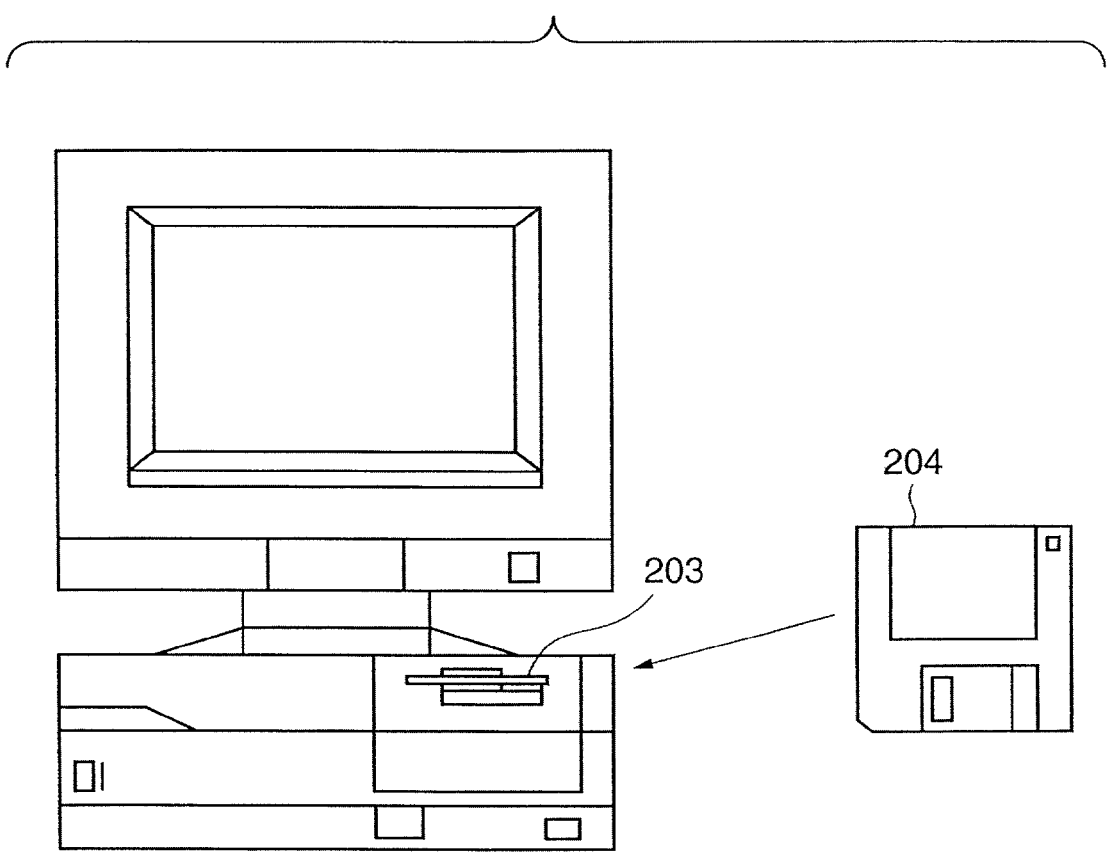
FIG. 5 illustrates the relationship with an FD to be inserted into an FD drive shown in FIG. 2.

Reference numeral 203 denotes a floppy disk (FD) drive as storage medium loading means, which can load programs and the like stored in an FD 204 as a storage medium into the computer system of this embodiment via an FD drive 203, as shown in FIG. 5 (to be described later).

Reference numeral 204 denotes a floppy disk (FD) as a storage medium, which stores a computer readable program. Note that the storage medium that can be used in the present invention is not limited to a magnetic storage medium such as an FD or the like, and includes optical (magnetooptical) recording media such as a CD-ROM, CD-R, CD-RW, DVD-RAM, DVD-R, MO, and the like, a detachable semiconductor storage device such as an IC memory card and the like, and so forth. The FD 204 stores a network printer control program and associated data described in this embodiment. The format of the storage contents will be described later using FIG. 4.

Reference numeral 205 denotes a hard disk drive (HD) which is one of external storage means, and serves as a large-capacity memory. The HD 205 stores application programs, a printer driver program, an OS, a network printer control program, associated programs, and the like. A spooler as spool means is assured on the HD 205. The spool means corresponds to a client spooler in the client, and a server spooler in the print server. In the print server, a table that stores job information received from the client and is used to make order control is also generated and stored in this HD 205.

Reference numerals 206 and 210 denote a keyboard and mouse as instruction input means, which are used by the user or the operator or administrator to input commands and instructions such as control commands and the like to the client computer or print server.

Reference numeral 207 denotes a display as display means, which displays commands input from the keyboard 206, printer status, and the like.

Reference numeral 208 denotes a system bus which controls the data flow in the computer serving as the client or printer server.

Reference numeral 209 denotes an interface as input/output means. The information processing apparatus exchanges data with an external apparatus via the interface 209.

Figure 3:
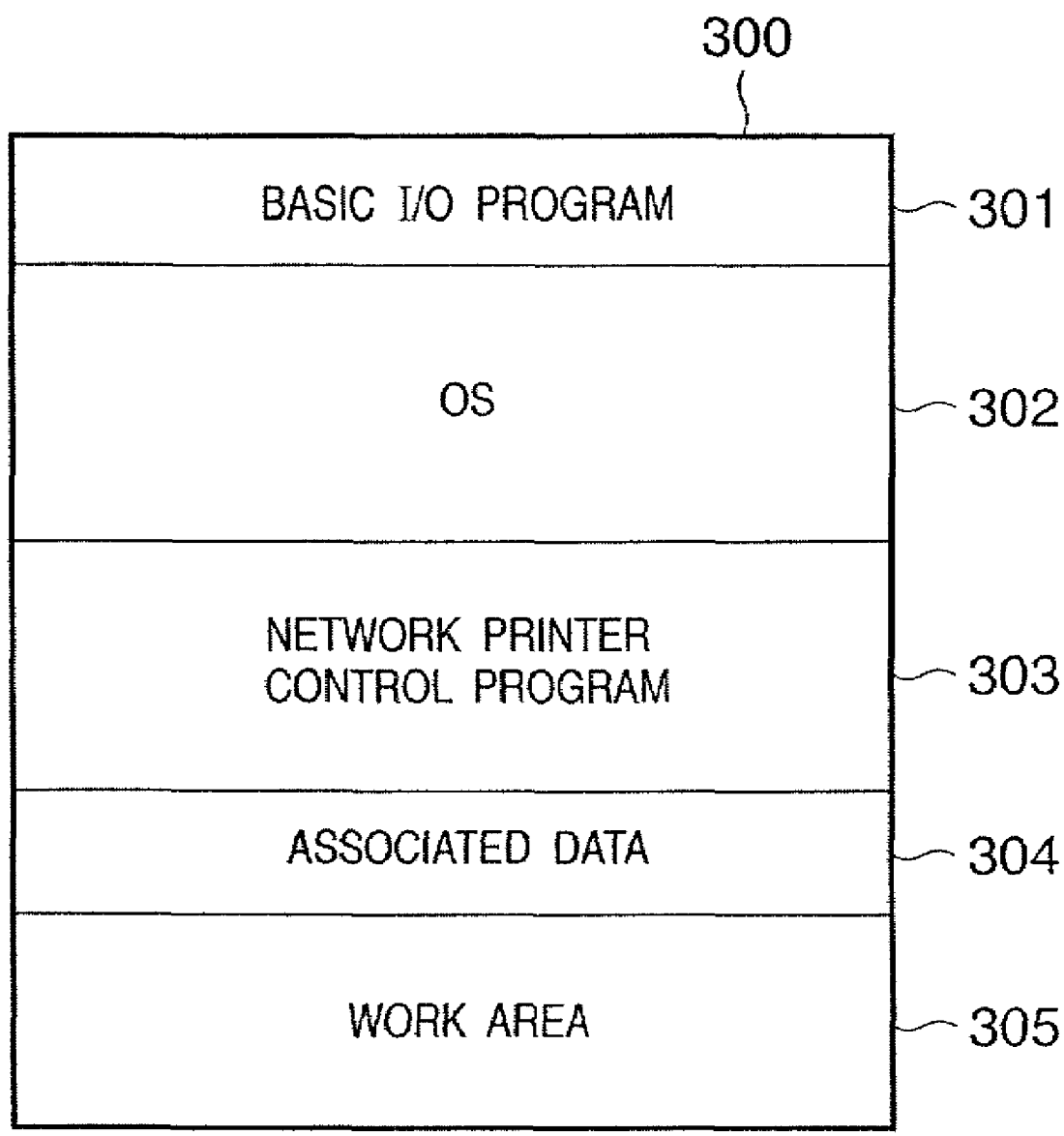
FIG. 3 shows an example of the memory map of a RAM shown in FIG. 2.

FIG. 3 shows an example of the memory map of the RAM 202 shown in FIG. 2, in which the network printer control program has been loaded from the FD 204 onto the RAM 202, and is ready to run.

This embodiment exemplifies a case wherein the network printer control program and associated data are directly loaded from the FD 204 onto the RAM 202 upon execution. In addition, every time the network printer control program is launched from the FD 204, the network printer control program that has already been installed in the HD 205 may be loaded onto the RAM 202.

The storage medium that stores the network printer control program is not limited to a magnetic storage medium such as an FD or the like, and includes optical (magnetooptical) recording media such as a CD-ROM, CD-R, CD-RW, DVD-RAM, DVD-R, MO, and the like, a detachable semiconductor storage device such as an IC memory card and the like, and so forth. Furthermore the network printer control program of this embodiment may be stored in the ROM 201 to form a part of the memory map, and may be directly executed by the CPU 200.

The network printer control program of this embodiment may often be simply called a print control program. The print control program includes a program which is used to designate a grouping job (of print jobs designated to be grouped) and making control for instructing a change in print destination in the client. Also, the print control program includes a program that makes order control of the grouping job, manages spooling of all print jobs in a group, and sends a print end message, print destination change request, and the like of the grouping job.

The print control program of the present invention that makes the aforementioned control may be separated into modules which are to be installed in the client, and those which are to be installed in the print server. Or the print control program may be installed by a single installation process, and modules to be executed may be selected depending on the environment in which that program runs, so that they serve as a program for the client or print server. The print control program in this embodiment implies both these patterns.

Reference numeral 301 denotes a basic I/O program, which is an area that stores a program which is loaded from the HD 205 onto the RAM 202 when the power switch of the information processing apparatus of the present invention is turned on, and has, e.g., an IPL (initial program loading) function of starting to run an OS upon loading.

Reference numeral 302 denotes an operating system (OS); and 303, a network printer control program which is stored in an area assured on the RAM 202. Reference numeral 304 denotes associated data, which are stored in an area assured on the RAM 202. Reference numeral 305 denotes a work area which is assured to execute the printer control program of this embodiment by the CPU 200.

Figure 4:
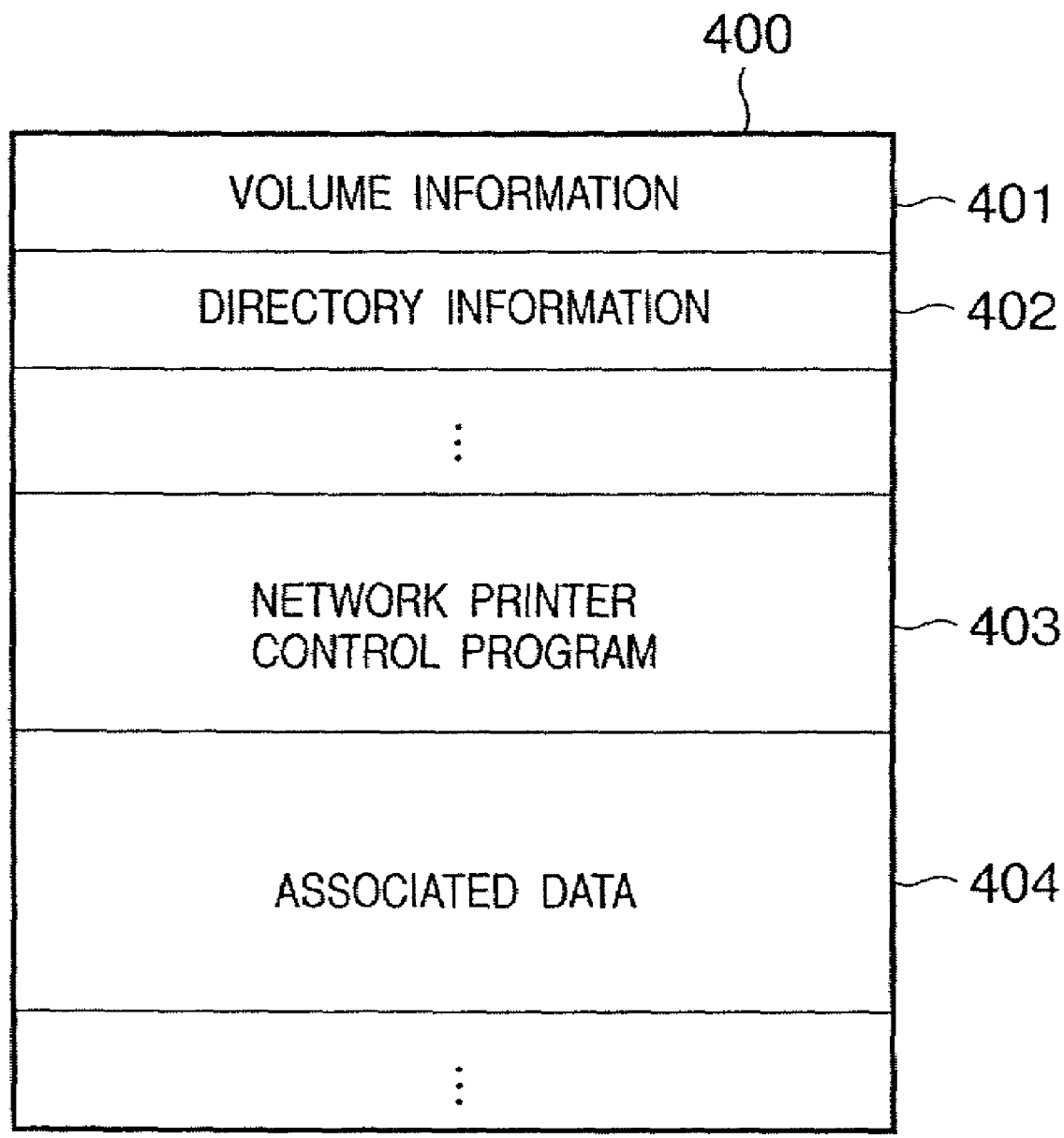
FIG. 4 shows an example of the memory map of an FD shown in FIG. 2.

FIG. 4 shows an example of the memory map of the FD 204 shown in FIG. 2.

Referring to FIG. 4, reference numeral 400 denotes the data contents of the FD 204; 401, volume information indicating information of data; 402, directory information; 403, a network printer control program as a print control program to be explained in this embodiment; and 404, associated data of that network printer control program. The network printer control program 403 is programmed based on flow charts to be explained in embodiments, and has a configuration common to the client and server in this embodiment.

FIG. 5 shows the relationship with the FD 204 to be inserted into the FD drive 203 shown in FIG. 2, and the same reference numerals in FIG. 5 denote the same parts as in FIG. 2.

Referring to FIG. 5, the FD 204 stores the network control program and associated data to be explained in this embodiment.

Figure 6:
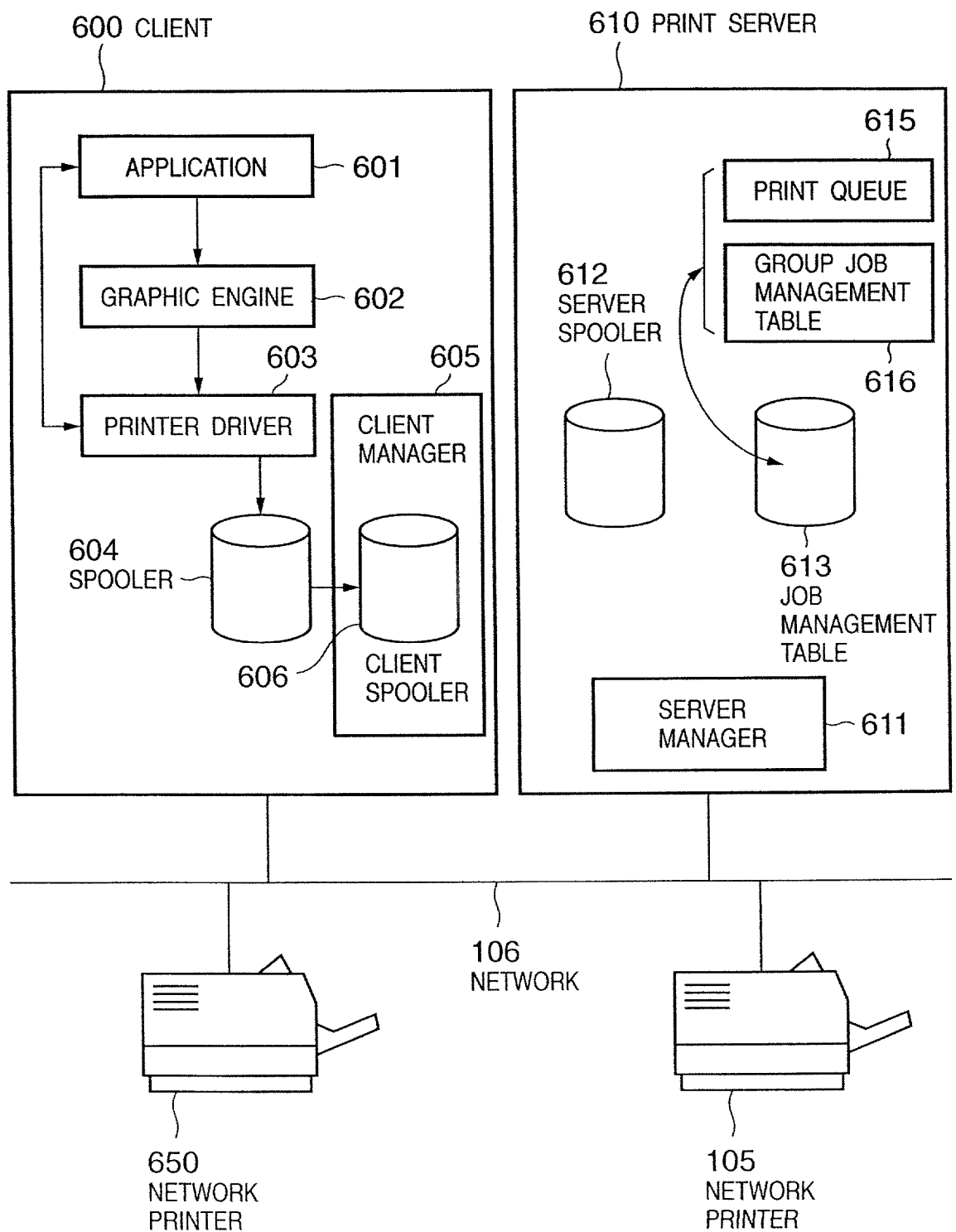
FIG. 6 is a block diagram for explaining the print control module arrangement of the information processing apparatus according to the first embodiment of the present invention.

FIG. 6 is a block diagram for explaining the print control module arrangement of the information processing apparatus of the present invention, and the same reference numerals in FIG. 6 denote the same parts as in FIG. 1.

Referring to FIG. 6, reference numeral 600 denotes a client machine on which a client module contained in the network printer control program as the print control program that implements the sequences shown in the flow charts to be described later runs.

In FIG. 6, reference numeral 601 denotes application software, which is used to create documents, tables, and the like, and outputs rendering data to a graphic engine 602 in a display or print process. The graphic engine 602 is rendering means provided by the OS, and corresponds to GDI (Graphics Device Interface) in the Windows (the registered trademark of Microsoft Corp.) OS. The graphic engine 602 converts GDI functions as rendering data output from the application 601 into DDI (Device Driver Interface) functions as rendering data that a device driver 603 which actually outputs the data can interpret, and outputs the DDI functions to the printer driver 603 as a device driver for a printer in a print process.

The printer driver 603 converts the DDI functions received from the graphic engine 602 into print data which contains a PDL (Page Description Language) that a printer can interpret, and outputs the print data to a spooler 604 (Windows Spooler in case of Windows OS) provided by the OS as a print job appended with a JL (Job Language). In a print setup process, the application 601 passes control to the printer driver 603, which displays a graphical user interface window on the display 207 (FIG. 2) as a display unit, and prompts the user to make various print setups including selection of client or server spool.

The spooler 604 of the OS passes print jobs received from the printer driver to a client spooler 606 in turn. A client manager 605 monitors the client spooler 606. When the client spooler 606 begins to spool a print job, the client manager 605 checks the setup of the print job. When the print job is set in a client spool mode, the client manager 605 extracts job information from the print job, issues a print request to a print server 610, and spools the print job in the client spooler 606. On the other hand, when the print job is set in a server spool mode, the client manager 605 issues the print job spooled in the client spooler 606 to the print server 610 as a print request, thus ending the print process of the client.

Upon receiving a clear to send message of a print job from the print server 601, the client manager 605 begins to directly send the print job spooled in the client spooler 606 to the network printer 105. At this time, the client manager 605 holds the print job sent to the printer 105 without deleting it, and deletes it upon receiving a print completion message from the print server 610.

Reference numeral 610 denotes a print server, which indicates a computer (machine) on which a print server module contained in the print network control program as the print control program that implements the sequences shown in the flow charts to be described later runs. Reference numeral 611 denotes a server manager which receives a print request from each client via the network 106. When the print request is a print job that contains print data, the server manager 611 spools the print job in a server spooler 612, and manages job information, the print request of which has been received, using a job management table 613 (job management means). On the other hand, when the print request is job information that does not contain any print data, the server manager 611 updates the job management table 613 on the basis of the job information.

The server manager 611 monitors the job processing state in each network printer 650 (105), updates the job management table 613 every time output of a print job ends, and begins to send the next print job. At this time, when a print job to be sent is spooled in the server spooler 612, the print server 612 sends the print job to the printer. When a print job to be sent is spooled in the client spooler 606, the server manager 611 issues a clear to send message of the print job to the client as the request source.

The job management table 613 has a print queue 615 which controls the print order on the basis of job information received from the clients, and manages the order of the next print job to which the clear to send message is to be issued, and a group job management table 616 used to manage if all pieces of job information of print jobs in a given group job are ready to print.

Reference numerals 105 and 650 denote network printers.

In FIG. 6, the respective functional blocks are laid out for the sake of convenience, and when both the server and client modules are present on an single information processing apparatus (machine), i.e., when the print server of which the client requests to print is present on a single machine, the print process is executed by an inter-process communication on the single machine without the intervention of the network. On the other hand, if the print server is another machine, the machine as the request source operates as one client.

The spooler of the OS may include functions equivalent to the aforementioned functions.

FIG. 7 shows an example of the data structure of job information which is generated by the client and is managed by the print server, as described above using FIG. 6. This job information is generated by the client manager 605 on the basis of a print job generated by the printer driver 603 of the client, and indicates the type of job. The job information is sent to the print server 610 as a print request.

As shown in FIG. 7, the job information of this embodiment is made up of a job ID 701 used to identify a print job from the print server to the client, a printer name 702 used to designate an output destination device, a machine name 703 serving as the host name of the client, print job status 704, a document name 705 (a document name normally given by an application) extracted from a document as a source of the print job, a print job data size 706, a spool method 707 (may be expressed by bit 0 or 1) for designating whether a print job is spooled using the client or server spooler, group print designation 708 indicating whether or not the print job is grouped with other jobs and its print control is made as a grouping job, a group name 709 used when the print job undergoes a grouping job process, an intra-group print order 710 indicating a print order in a group in a group print process, an intra-group job count 711 indicating the number of print jobs included in a group in a group print process, and the like.

FIG. 8 shows an example of group designation information managed by the client 600 shown in FIG. 6. In this embodiment, the client manager 605 generates this group designation information upon receiving a print job, as will be described alter. Alternatively, the printer driver 603 may generate the group designation information on the basis of the values that the user designates on a user interface window, which is provided by the printer driver 603 in a print designation process from the application.

As shown in FIG. 8, the group designation information in this embodiment is made up of a client name 801 as the host name of the self client, a group name (ID) 802 indicating a group name used in a group print process of print jobs, a print order 803 indicating a print order in a group in a group print process, a total job count 804 of the group, and the like.

Figure 9:
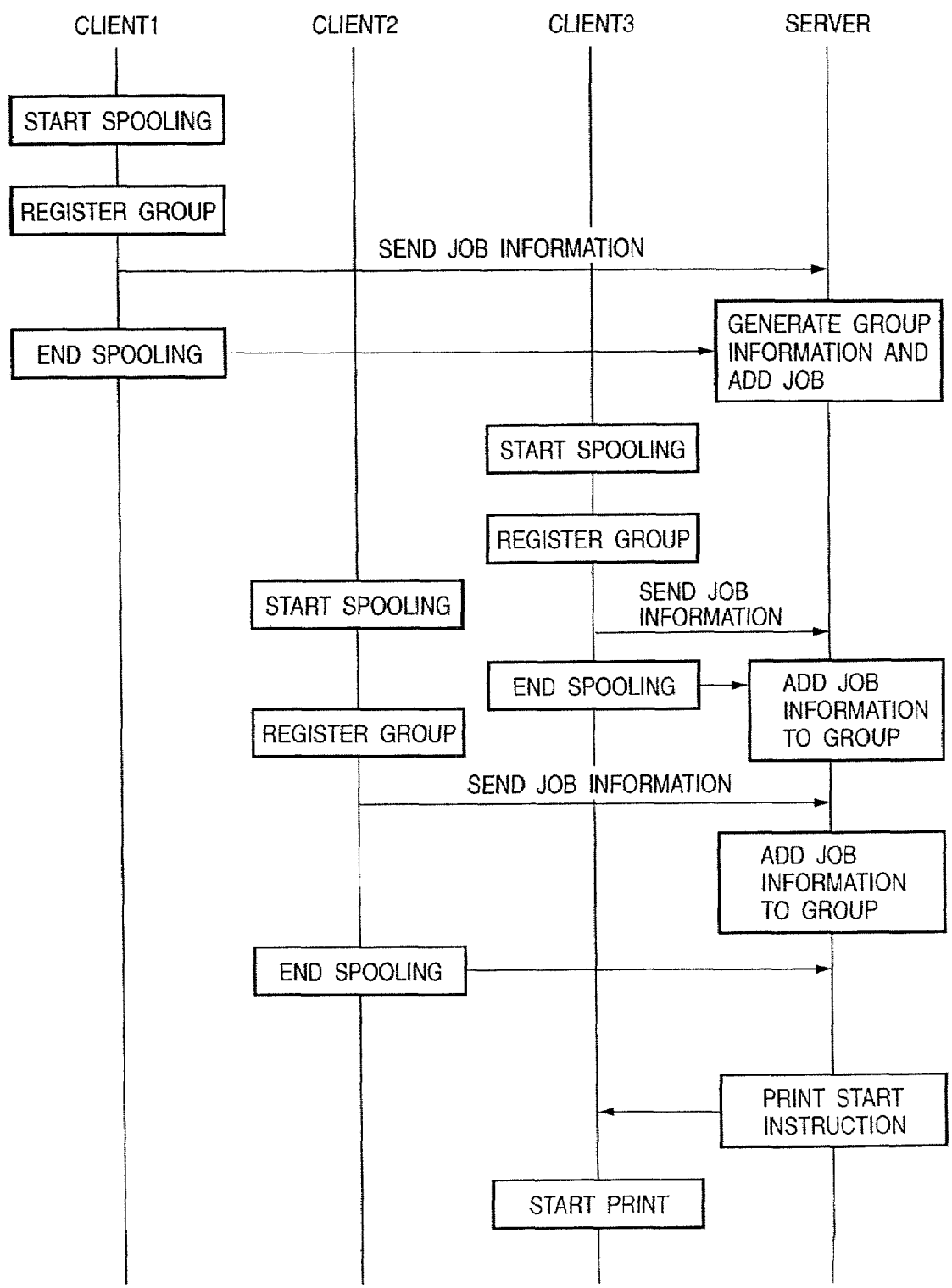
FIG. 9 is a schematic sequence chart of the process of the present invention.

FIG. 9 is a sequence chart showing the operations of the clients and print server upon executing a group print process of print jobs from three clients.

FIG. 9 shows the sequence when clients 1, 2, and 3 respectively spool print jobs (print jobs 1, 2, and 3) in their client spoolers, and send job information to the print server, and the print server groups the print jobs on the basis of the job information, and executes print processes in the print order designated by the clients, i.e., in the order of print jobs 3, 2, and 1.

Client 1 executes generation of a print job which is to be printed as a group job, and a client spool process (steps S901 and S902). Upon generating the first job in a group, group designation information shown in FIG. 8 and job information shown in FIG. 7 are generated simultaneously with generation of the print job, and a group print instruction is sent to the print server using the group designation information and job information (step S903). At this time, the print server generates group information based on the received group designation information and job information, and adds a new job group to be managed to the aforementioned group job management table (step S905).

The group job management table has cells corresponding to the total job count in a group job, and is updated when "ready to print (standby) state" is written in the corresponding cell on the basis of the intra-group print order information contained in the job information received from each client. The server manager 611 monitors the group job management table 616 in the job management table 613 to check if all cells corresponding to the total job count in the group job have status "ready to print state". If all print jobs in a given group have status "ready to print state", i.e., if they have been spooled in the clients or server, the server manager issues a print request to the print queue 615 corresponding to the output destination printer so as to start the print processes of the group job, and starts order control with other print jobs.

Clients 3 and 2 input job information (with the designated group name) shown in FIG. 7 to the server to update the group job management table 613, and the server issues print requests to the print queue 615, as described above. Note that the print order in the group is the order of clients 3, 2, and 1, but the timing at which job information is issued to the print server or the timing at which a print request is spooled in each client spooler can be arbitrary. This is because the job information of each print job specifies the print order in the group.

When the printer driver starts a print process of the print job to be grouped in client 1 in FIG. 9, the print job is temporarily spooled in the spooler 604, and is then output from the spooler 604 as in a normal print process when viewed from the OS. In this embodiment, the client manager 605 spools this output print job in the client spooler 606 before that print job is sent to the print server. In case of client spool, the client manager 605 generates job information while spooling the print job in the client spooler 606, and issues the job information to the print server 610 as a print request.

Note that the printer driver 603 may generate the job information. On the other hand, if server spool is selected, the client manager 605 issues a print job spooled in the client spooler 606 to the print server 610 as a print request, and the print job is spooled in the server spooler 612 of the print server.

Figure 10:
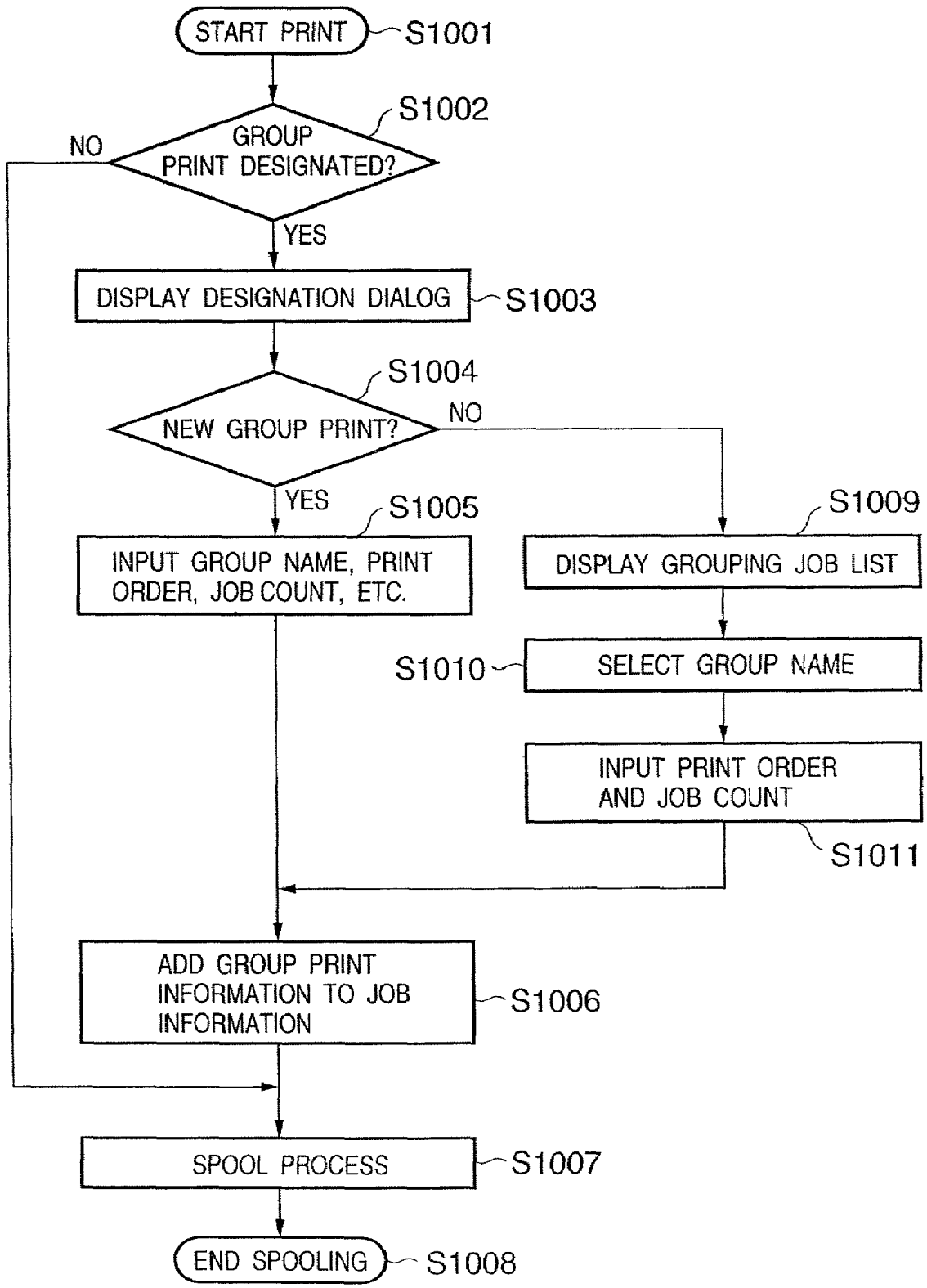
FIG. 10 is a flow chart showing an example of the first data processing sequence in the information processing apparatus according to the present invention.

FIG. 10 is a flow chart showing an example of the first data processing sequence in the information processing apparatus according to the present invention, and corresponds to the spool processing sequence by the client 600 shown in FIG. 6. Note that S1001 to S1006 indicate steps.

Figure 19:
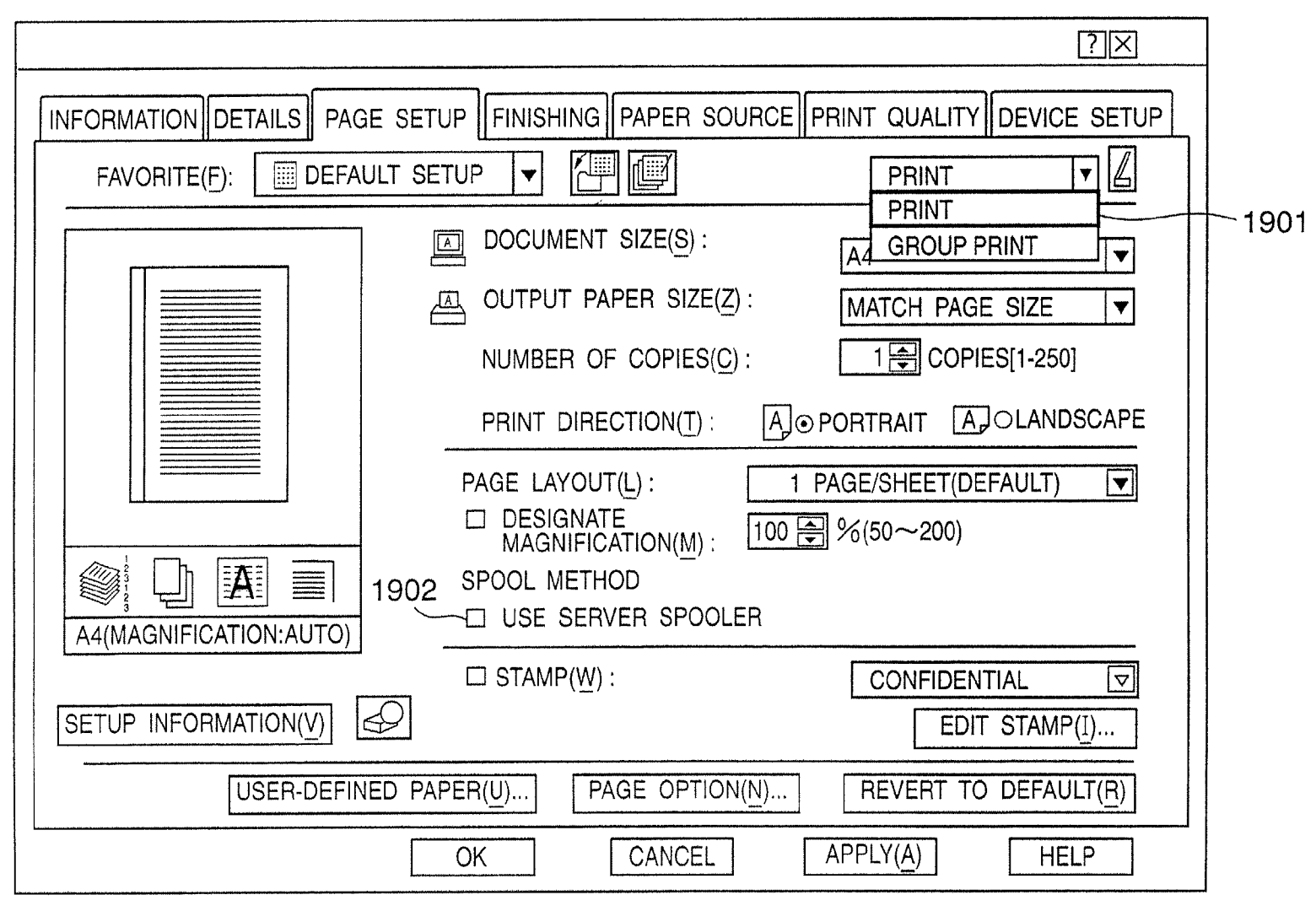

In step S1001, the user makes print setups using a graphical user interface (FIG. 19) for print setups, which is provided by the printer driver 603, when the application 601 starts a print process. Note that the printer driver 603 provides this graphical user interface window for print setups shown in FIG. 19 and displays it on the display 207 (FIG. 2) via the OS. In FIG. 19, reference numeral 1901 denotes a menu which allows to set the type of print job. When "print" is selected, a print job is generated as a normal print process, and is sent to the print server or printer together with a print request.

On the other hand, when "group print" is selected, a print job is generated as a group print job (also called a grouping job) and is spooled in the print server or client, and job information is output to the print server.

If the user has set print setup values and input a print start instruction, the application 601 begins to output rendering data to the graphic engine 602, i.e., starts a print process. In this manner, the graphic engine receives GDI functions as rendering data, converts them into DDI functions, and passes the DDI functions to the printer driver 603. The printer driver 603 generates print data described in a page description language on the basis of the received DDI functions, and issues a print job to the spooler 604. The spooler 604 outputs the received print job to the client manager 605.

When the client manager 605 begins to spool the print job received from the spooler 604 in the client spooler 606, it acquires a job ID from the server manager 611 of the print server 610, and generates job information shown in FIG. 7 like JOB_INFO_2 of Windows OS. The job information other than "job ID" 701 can be generated based in information in the client. For example, "printer name" 702 can be acquired from the printer name or path designated as the output destination, and "document name" 705 can be acquired from the application 601. Also, "group print designation" 708 can be generated by checking if "group print" or "print" is selected from the pull-down menu 1901 on the setup graphical user interface window shown in FIG. 19, as described above.

On the other hand, "spool method" 707 can be acquired by checking if a check box 1902 "use server spooler", which is used to set the spool method in FIG. 19, is checked. If this check box is checked, information indicating that the server spooler is used can be generated; otherwise, information indicating that the client spooler is used can be generated.

Note that the communication method between the client and server may use multi-protocol functions such as RPC, or a process using communication functions of Winsock or Win32API, and does not depend on a specific communication method.

Referring back to FIG. 10, the client manager 605 checks in step S1002 if this job is a group print job or a normal print job. This checking is done by acquiring the print setups of the print job or by looking up "group print designation" 708 of the generated job information.

In the above description, "group print designation" 708 is designated by the user using the graphical user interface for print setups provided by the printer driver 603, and a print instruction is then issued. Display of this graphical user interface window may be designated as a DLL registered as a port monitor of the spooler 604, a method of displaying a dialog by the client, or a dedicated group print port for each port every time data flows through a port (not shown) as a contact between the printer driver 603 and spooler 604. Furthermore, a group print process may be automatically done on the basis of information such as a specific document name used by the application, the job ID uniquely assigned by the spooler 604, and the like that the information processing apparatus which forms the print system of the present invention can specify a print job to be grouped.

This designation can be registered as a setup for each port on the client since a group print job is different from a normal job only in that designation information associated with a group print process is appended to job information of each job. However, no special setups are required for the printer or print server as common resources to other clients.

If it is determined in step S1002 that the current job is a group print job, the client manager 605 provides a dialog box (FIG. 17) for receiving designation from the user to the OS, and displays it on the display 207 in step S1003. On the dialog box shown in FIG. 17, the user can designate a group name (or ID) of the designated group print process, the total job count in the group, and the print order of jobs. The user designates the group name and print order using the keyboard 206, mouse, and the like.

The group print designation method is not particularly limited as long as the contents of group designation information can be uniquely determined with respect to information (document name, job ID, or the like) that can specify a job, since group designation information need only be designated for each job. In place of user's manual input on the displayed dialog box, designated values of the client in a registry, INI files, and the like may be used, or a plurality of pieces of information may be held and may be selected by the user.

Figure 17:
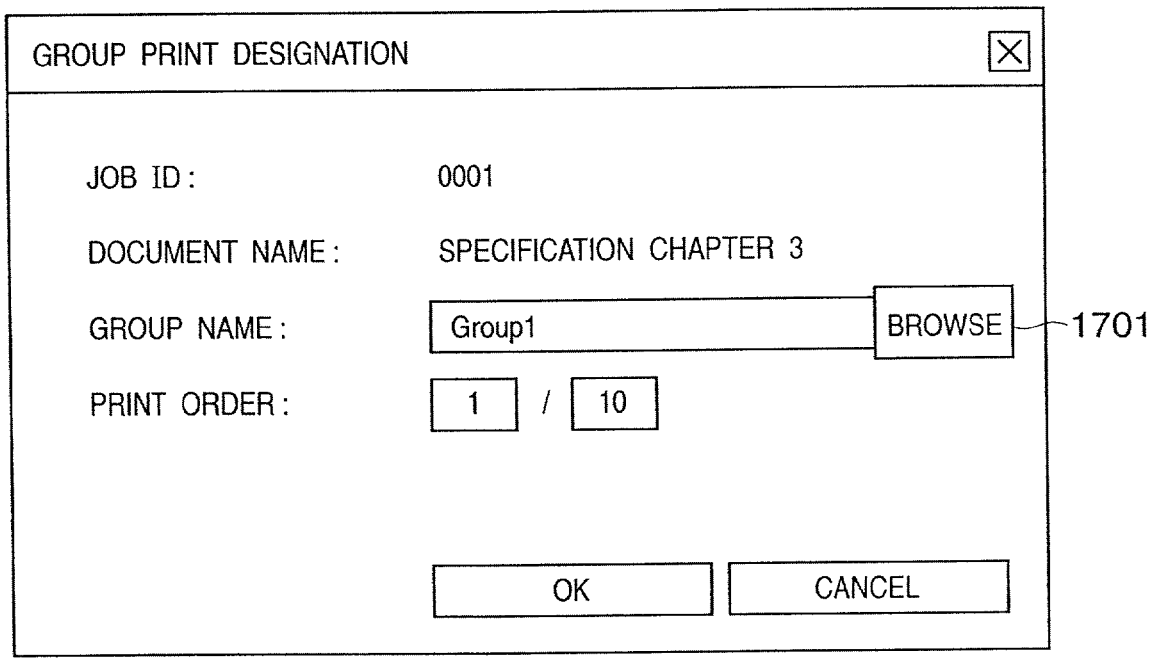
FIG. 17 shows an example of a dialog box window which is provided by a module in the client and is used to designate a group print process.

The client manager checks in step S1004 on the basis of the group name input by the user on the dialog in FIG. 17 displayed in step S1003 if this grouping job is a new grouping job or a grouping job that has already been registered in the print server 610. That is, upon designating a group name in FIG. 17, if the user inputs a new name, a new grouping job is determined; if the user has pressed a "browse button" 1701 to browse the group name of the grouping job that has been registered in the print server, the already registered group print is determined. If a new group print is determined, the flow advances to step S1005.

In step S1005, the client manager 605 prompts the user to manually input information of the print order in the new group job, and the total number of print jobs in the new group job. Also, the client manager 605 appends group print designation information including the group name, intra-group print order, and intra-group job count to the job information in FIG. 7.

In step S1006, the client manager 605 appends information of the group name (or ID), print order, total job count, and the like which designate a group print process shown in FIG. 8 to the job information of that print job on the basis of the inputs on the dialog box. The description of this embodiment is premised on that the job information includes members for a group print process. However, the group print designation information can be implemented without preparing for any special members by embedding information that can determine a group print process in comment information or a document name. For example, a character string Group01_1_5 (group name_print order_total job count) may be appended to the comment or document name.

In step S1007, the client manager 605 executes a spool process of the print job. The spool process is done as follows. The client manager 605 looks up "spool method" 707 of the job information (FIG. 7) to determine if the print job is set in a client or server spool mode. If it is determined that the print job is set in the client spool mode, the client manager 605 spools the print job received from the spooler 604 in the client spooler 606 in correspondence with the group designation information, and sends the job information and group designation information (FIG. 8) of that print job to the print server 610. On the other hand, if it is determined that the print job is set in the server spool mode, the client manager 605 sends the print job, job information, and group designation information to the print server 610, and releases the print process in the client 600.

The spool sequence of clients 2 and 3, i.e., the sequence for adding remaining print jobs to the corresponding grouping job after the setup of the grouping job has been made will be explained below.

Since the sequence from step S1001 to S1003 is the same as that in the above process, a description thereof will be omitted. The client manager 605 checks in step S1004 on the basis of the group name input by the user on the dialog in FIG. 17 displayed in step S1003 if this grouping job is a new grouping job or a grouping job that has already been registered in the print server 610. When the mouse 210 is clicked while the "browse" button 1701 is pointed by the pointer of the mouse 210 operated by the user on the dialog in FIG. 17, and a browse instruction of the group names of grouping jobs registered in the print server 610 is issued, it is determined that the job is to be added to the already registered group print job, and the flow advances to step S1009.

In step S1009, the client manager 605 inquires the server manager 611 in the print server 610 of a list of grouping jobs spooled in the print server 610. Such inquiry means can be implemented by a general inter-process communication (e.g., by processing an API such as EnumJobs of Win32API by RPC).

In response to this inquiry, the print server 610 executes the following process. Upon receiving the grouping job list inquiry from the client manager 605, the server manager 611 looks up the group job management table 616 managed by the job management table 613, and generates a grouping job list to be sent back to the client manager 605. The server manager 611 sends back the generated list to the client manager 605. On the other hand, upon receiving a request other than the inquiry, various spool processes are executed.

Upon receiving a print request containing job information from the client, the server manager 611 determines that it has received the print request, and makes the job management table 613 manage the print order. At this time, if it is determined by interpreting the job information that the print request is a group print job, the job management table 613 updates the group job management table 616 in which a new job or a job of the given print order in the already registered grouping job is spooled, and the server manager 611 spools the print job in the server spooler 612 at the same time. If the spool method is client spool, only job information is managed, and the spool process is executed by the client.

Figure 18:
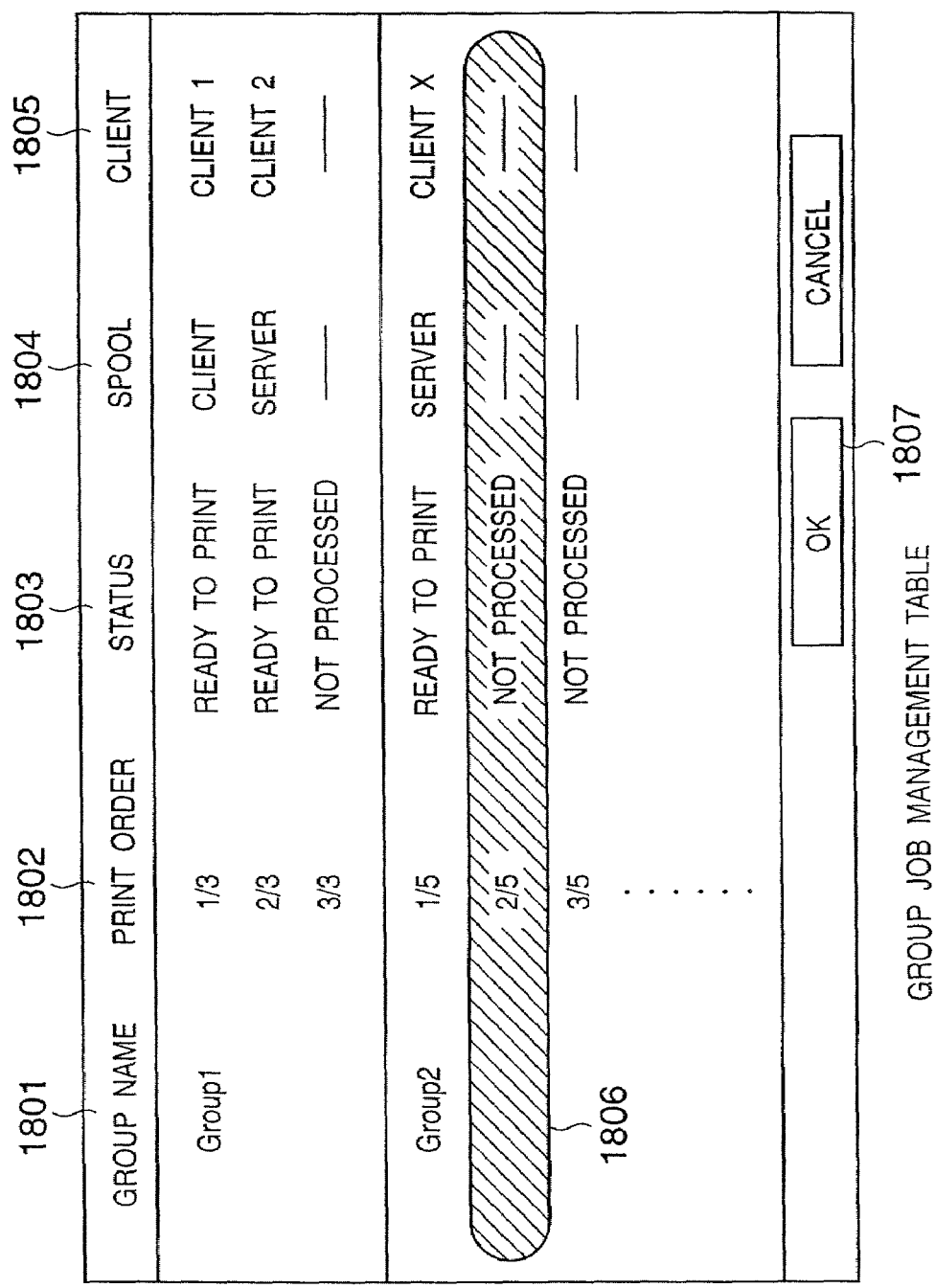
FIG. 18 shows an example of a graphical user interface window displayed on the client in accordance with a group job management table managed by a print server.

In step S1009, the client manager 605 acquires the grouping job list from the server manager 611 in response to the aforementioned inquiry, generates display data, and displays that data on the display 207 via the OS, as shown in FIG. 18.

FIG. 18 shows an example of the display window generated by the client manager 605 on the basis of the list of grouping jobs managed by the group job management table 613.

Reference numeral 1801 denotes the group name of a grouping job managed by the print server 610. Reference numeral 1802 denotes the print order of print jobs included in each group, which is displayed in the form of print order/total job count. Reference numeral 1803 denotes the status of a given print job: "ready to print" indicates that the print job of interest has already been spooled; and "non-processed" indicates that the print job corresponding to a given print order has not been spooled yet. Reference numeral 1804 denotes a spool method: "client" indicates that a print job containing print data is spooled in the client spooler 606; and "server" indicates that a print job containing print data is spooled in the server spooler 612. Reference numeral 1805 denotes the client name of a client that issued the print request of the corresponding print job.

On this graphical user interface, the user can determine the selection state for each print job using the keyboard 206 or a pointing device such as the mouse 210. In the example shown in FIG. 18, a print job of the second print order in Group2 within a range 1806 is set in a selection state. When the user designates an OK button 1807 in this selection state, respective items on the group print designation dialog shown in FIG. 17 are automatically selected. For example, when the user designates the OK button 1807 while the range 1806 is selected, "Group2" and "⅔" are automatically input to the group name and print order in FIG. 17.

In this manner, if the user designates a print job, as shown in FIG. 18, the client manager 605 detects the group name of the designated print job, and inputs the detected group name to the group name item in FIG. 17 in step S1010. Subsequently, if the user designates a print job, as shown in FIG. 18, the client manager 605 detects the print order of the designated print job and the total print job count, and inputs them to the respective items in FIG. 17 in step S1011.

In this embodiment, the user designates a job in a grouping job using the graphical user interface window to automatically input respective items. However, the present invention is not limited to this. For example, the client manager 605 may acquire only the group names of grouping jobs from the print server, may make the user designate a desired grouping job from the acquired group names, and may then make the user manually designate the print order and the like.

After various designations of the group print job have been done, the flow advances to step S1006. Since step S1006 and the subsequent steps are the same as those in the aforementioned process, a description thereof will be omitted.

FIG. 16 shows an example of the data structure of group print information generated by the server manager 611 of the print server 610 shown in FIG. 6. This group print information is generated on the basis of the job information and group designation information received from the client.

As shown in FIG. 16, in this embodiment, the group print information contains a group name, total job count, print destination printer name, printer status, and alternate printer name in a header, and then contains information of each job, which includes a job ID, print order, status, client name, and the like.

The spool process of the server manager 611 which runs on the print server 610 shown in FIG. 6 will be described below with reference to the flow chart shown in FIG. 11.

Figure 11:
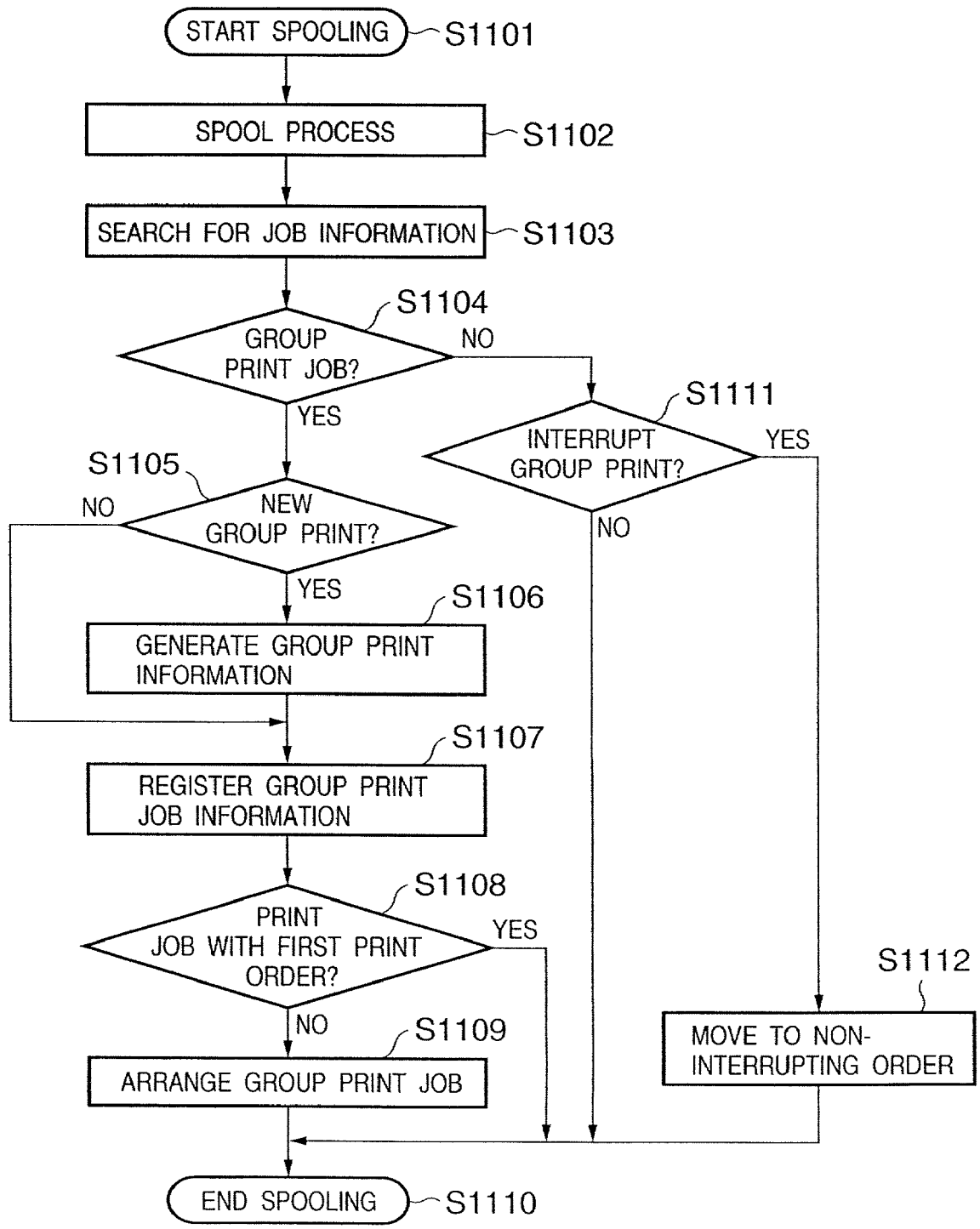
FIG. 11 is a flow chart showing an example of the second data processing sequence in the information processing apparatus according to the present invention.

FIG. 11 is a flow chart showing an example of the second data processing sequence in the information processing apparatus according tot he present invention, and corresponds to the spool process by the server manager 611 which runs on the print server 610 shown in FIG. 6. Note that S1101 to S1112 indicate steps.

If the spool process of a job from the client machine 600 starts in step S1101, the server manager 611 generates a job ID, and passes it to the client manager 605. The server manager 611 then executes the following spool process in step S1102.

In step S1102, the server manager 611 receives job information and a print request from the client manager 605. Also, the server manager 611 receives group designation information from the client manager 605 as needed. Upon receiving the print request, the server manager 611 updates the print queue to start management of the print order of the print queue 615 upon receiving a new job, and spools a print job received from the client in the server spooler 612. If no print job is received from the client, i.e., if the client spool process of the print job is done, the print job is spooled on the client side, and the print server 610 executes print order management.

Subsequently, the server manager 611 searches the job information received from the client manager 605 in step S1103. The server manager 611 checks in step S1104 based on the presence/absence of group print designation information in that job information if that job is a grouping job as a print job designated with the group print process.

If it is determined that the job is a print job designated with a group print process, the process branches depending on whether the job to be spooled is the first one in the group or the second or subsequent one.

Hence, the server manager 611 checks in step S1105 based on the job information and group designation information if the received print job is the first print job in the group. If a new group print process is determined, the flow advances to step S1106; if group print information (GP-INFO) shown in FIG. 16 has already been generated on the storage device (HD 205), the flow advances to step S1107.

In step S1106, the server manager 611 generates new group print information (GP-INFO), and stores it in the group job management table 616 of the job management table 613. This group print information GP-INFO is managed as list data for each printer designated in a print process.

In step S1107, the server manager 611 records information unique to the job, such as a print request source client name (or address), intra-group print order, and the like, which are extracted from the job information, in the generated group print information (GP-INFO).

The server manager 611 then checks in step S1108 if the job is the first one in the group. If the job is the first job, since the spool order of that job becomes the print order of the group, the job position remains unchanged, and the flow advances to step S1110 to end the spool process.

If it is determined in step S1108 that the print job is not the one with the first print order in the group, the flow advances to step S1109 to arrange job information of the print job in correspondence with the designated order in the group, and also to arrange the spool order of the print job in the server spooler 612 as needed.

The spool order of a print job will be explained below. This process is executed in the spool process of a server spool print job. More specifically, if the already spooled jobs in the group print information (GP-INFO) include one having a print order earlier than that of the job of interest, the job of interest is moved to a position immediately after that job; if only jobs with print orders before that of the job of interest are spooled, the job of interest is moved to the head position of those jobs. After that, the flow advances to step S1110 to end the spool process. Since the print jobs are spooled in this way, they can be easily read out upon executing the print process of a grouping job. However, even when the print jobs are spooled not in a print order, a print process according to a print order can be done.

On the other hand, if it is determined in step S1104 that the job to be spooled is not a group print job, the flow advances to step S1111. The server manager 611 checks in step S1111 if the current spool position interrupts a plurality of print jobs in a given group. If it is determined that the spool position interrupts jobs designated with a group print process in a given group due to another order change designation such as priority or the like (YES in step S1111), it is checked based on the job information if the previous and next jobs are designated with a group print process, and the spool position is changed after these jobs in step S1112. On the other hand, if it is determined in step S1111 that the normal spool position of that job does not interrupt group print jobs, the flow advances to step S1110 to end the spool process.

As for the print process of the spooled job, the process of the server manager 611 of the print server 610 will be described below with reference to the flow chart shown in FIG. 12.

Figure 12:
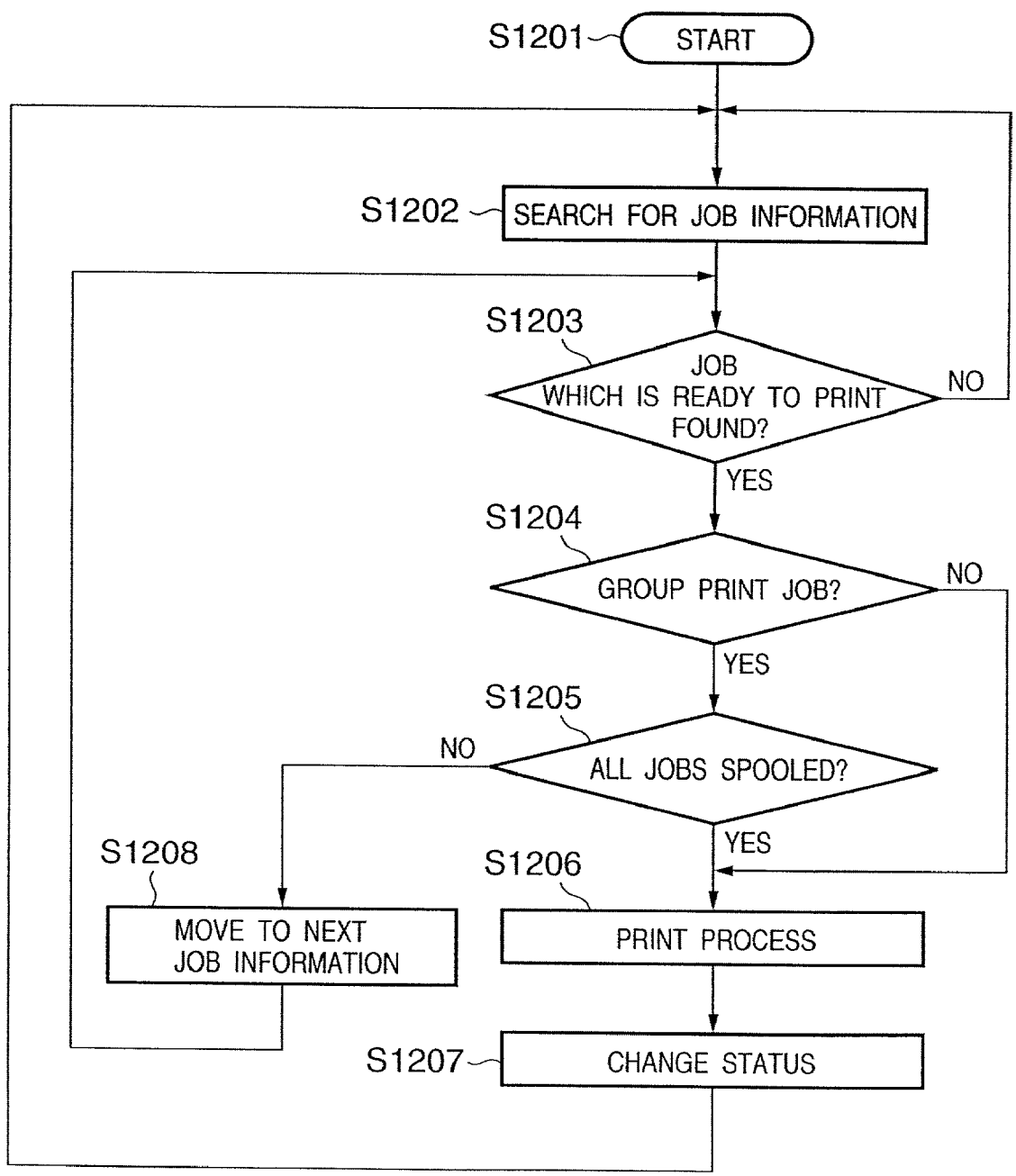
FIG. 12 is a flow chart showing an example of the third data processing sequence in the information processing apparatus according to the present invention.

FIG. 12 is a flow chart showing an example of the third data processing sequence in the information processing apparatus according to the present invention, and corresponds to the processing sequence of the server manager 611 in the print server 610 shown in FIG. 6. This process is executed in processing units such as threads in Windows OS, i.e., the server manager 611 monitors status data of printers to be managed connected to the network, while the server manager 611 manages spooled jobs and begins to send print jobs in turn to the corresponding printers. Note that S1201 to S1208 indicate steps.

In step S1201, the server manager 611 monitors status data of printers to be managed, and if it is determined that a print job can be sent to one of the monitored printers, this process is launched. In step S1202, the server manager 611 searches for job information spooled in the job management table 613. It is checked in step S1203 if the job management table 613 includes a print job which is ready to print among those to be sent to the corresponding printer. This state is a steady state, and if no print job which is ready to print is found, the control waits until it is determined in step S1203 that a job which is ready to print is found, and that job is spooled.

If it is determined in step S1203 that a job which is ready to print is found, the server manager 611 checks in step S1204 if the print job which is ready to print is a group print job. If that print job is a group print job, the server manager 611 checks in step S1205 by analyzing the group job management table 616 if all print jobs in a given group are spooled.

If it is determined that all print jobs in the group are spooled, the server manager 611 executes the print process of that grouping job in step S1206. More specifically, the server manager 611 sequentially sends the spooled print jobs in accordance with the print order in the group on the basis of the group job management table 616.

In this sending process, the server manager 611 recognizes the spool method of a print job in its print turn. If the spool method of that job is server spool, the server manager 611 reads out the corresponding print job saved in the server spooler 612, and sends that print job to the printer via the network. On the other hand, if the spool method of that job is client spool, the server manager 611 recognizes the client 1805 as the request source from the group job management table 616 shown in FIG. 18, and issues print job clear to send information containing information for designating the job ID to that client.

Upon completion of sending of print data from the print server 610 or client 600 to the printer 105, the server manager 611 changes the status information of the group print information (GP-INFO) managed by the group job management table 616 and status data 1803 of the group job management table 616 shown in FIG. 18 in step S1207 to "end of sending", and starts the process of a print job corresponding to the next print order. By repeating this print sequence, jobs in a given group are successively sent to the printer 105 to execute their print processes.

On the other hand, if the print turn of the first job in a given group has been reached before all jobs in that group are spooled, and it is determined in step S1205 that all print jobs in that group are not spooled yet, the flow advances to step S1208, and the server manager 611 shifts control to the next print job in the print queue of the corresponding printer. The flow then returns to step S1203 to similarly process the next job.

On the other hand, if it is determined in step S1204 that a print job in its print turn in the print queue 615 is a normal print job (not a group print job), the flow jumps to step S1206, and the server manager 611 executes the aforementioned print process (print job delivery control). With the aforementioned sequence, the print process in the print server 610 is executed.

If print confirmation is not made, the group print information (GP-INFO) is deleted together with a job after data transfer.

By executing these sequences, even when a series of a plurality of print jobs, print requests of which have been issued from a plurality of host computers at arbitrary timings, are spooled in the print server together with a normal print job or in the client, they can undergo successive print processes together by the designated printer in the designated order.

Second Embodiment

After the print process according to the sequence described in the first embodiment, the server manager 611 of the print server 610 may acquire print confirmation of each print job from the printer 105 as in a normal print job, record it in the group print information, and send a print end message to the client manager 605 of the client 600 that spooled the jobs after the end of the print processes of all print jobs in the group print information is confirmed. This embodiment will be explained below.

Figure 13:
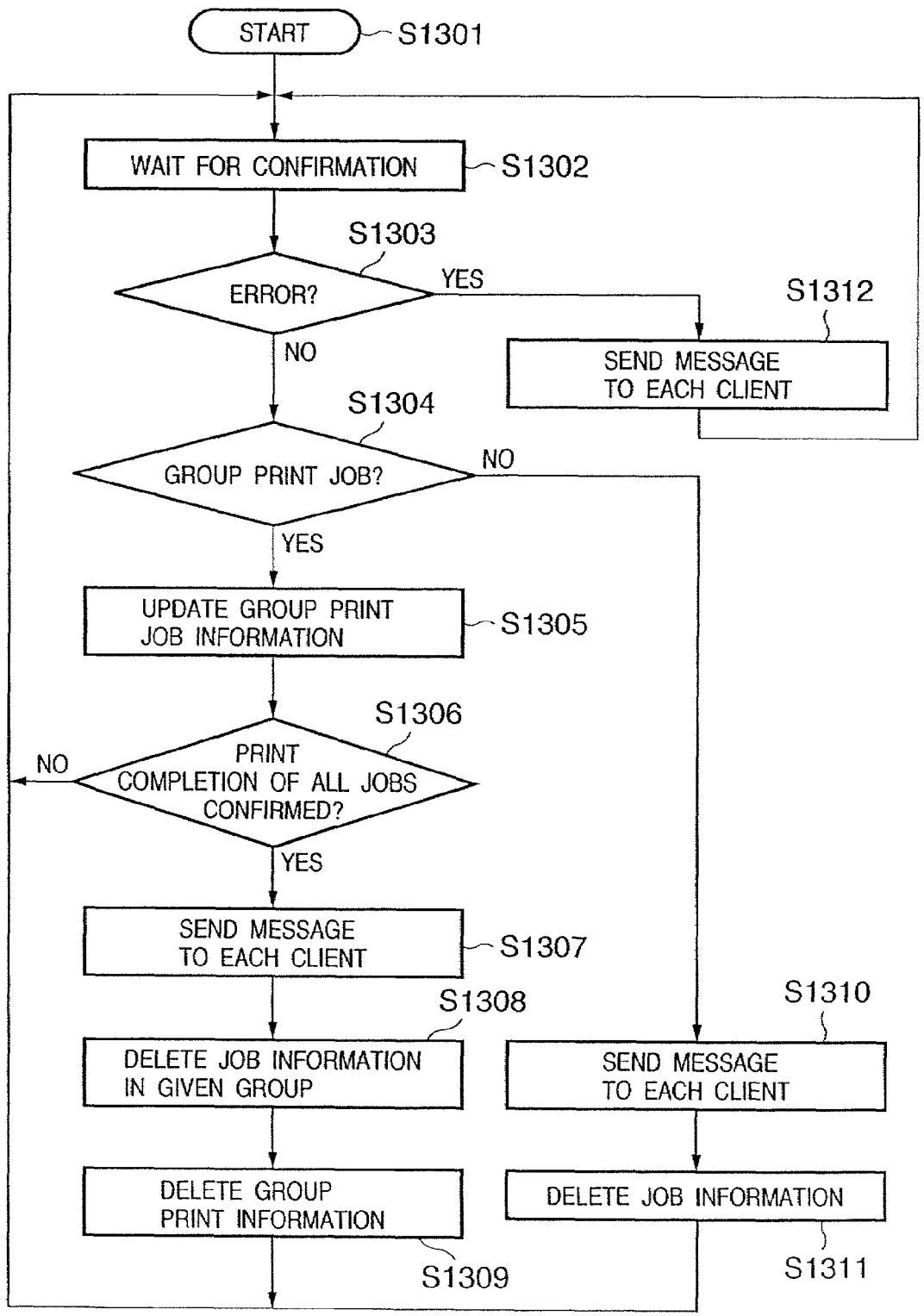
FIG. 13 is a flow chart showing an example of the fourth data processing sequence in the information processing apparatus according to the present invention.

FIG. 13 is a flow chart showing an example of the fourth data processing sequence in the information processing apparatus according to the second embodiment of the present invention, and corresponds to a print confirmation thread (detailed sequence of a print confirmation sequence) by the server manager 611 shown in FIG. 6. Note that S1301 to S1312 indicate steps.

In step S1301, this print confirmation thread starts. This thread may start upon launching the server manager 611, and may reside until the power switch of the server machine 610 is turned off, or the thread may run after the print process until print confirmation is acquired and end its operation at an arbitrary timing.

After the thread has started, the server manager 611 monitors status data of printers to be managed via the network, thus waiting for a print confirmation message from the printer 105.

In this confirmation method, when the printer 105 is a network printer which uses TCP/IP as a network protocol, the print server 611 may poll using a command such as get or the like of SNMP, or may receive a message from the printer by trap or the like.

On the other hand, when the printer is locally connected via a cable, a communication via the cable may be made, and the protocol and information acquisition method need not be particularly limited.

Upon acquiring a print confirmation message from the printer 105, the server manager 611 checks in step S1303 if an error message of a print job is received from the printer 105. If it is determined that an error message is received, the flow advances to step S1312, and the server manager 611 recognizes the client as the print job request source using the group job management table shown in FIG. 18, and informs the client manager 605 of the corresponding client 600 of that error.

On the other hand, if it is determined in step S1303 that no error message is received, the server manager 611 checks in step S1304 based on job information of a print job, the end of the print process of which has been confirmed, if the job of interest is a group print job. If it is determined that the job of interest is a group print job, the server manager 611 changes status data 1803 of the corresponding print job in the group print information (GP-INFO) from "print in progress" to "end of print" in step S1305.

The server manager 611 checks in step S1306 if the end of the print processes of all print jobs in the group print information (GP-INFO) can be confirmed. If it is determined that a job, the print process of which is in progress, still remains, the flow returns to step S1302 to wait for a print confirmation message from the printer 105.

If it is determined in step S1306 that the print confirmation message of the last job in the group is received, the flow advances to step S1307, and the server manager 611 sends a message to the client manager 605 of each client 600 that has issued the print requests of print jobs in the group. After the message is sent to respective clients, the server manager 611 deletes all pieces of job information of that group in step S1308.

When print jobs containing print data remain in the server spooler 612 after the print processes, the server manager 611 delete print data together with the job information.

After all the pieces of job information in the group are deleted, the server manager 611 deletes the group print information, the print process of which is complete, in step S1309, and the flow returns to step S1302.

On the other hand, if it is determined in step S1304 that the print confirmation message of a normal job is received, the server manager 611 sends a message to the client manager 605 of each client in step S1310, and deletes job information and print data in step S1311. After that, the flow returns to step S1302.

With this sequence, the print confirmation process of the group print process can also be done by adding a few extra processes to the print confirmation sequence of a normal job.

In this way, even when only a print confirmation message for each job is acquired from the printer 105, the combined print and paper output results of print jobs can be confirmed, and a combined print end message can be sent to host computers that issued the print requests of respective print jobs.

Third Embodiment

In the second embodiment, the combined print and paper output results of print jobs corresponding to print requests are confirmed, and a combined print end message is sent to clients (or host computers) that issued the print requests of respective print jobs. In such case, some error may occur in the printer 105 during the print process. When an error has actually occurred in the printer before the combined print and paper output processes of print jobs corresponding to print requests are completed, the print destination of these print jobs may be changed to another printer on the network. Such embodiment will be explained below.

Figure 14:
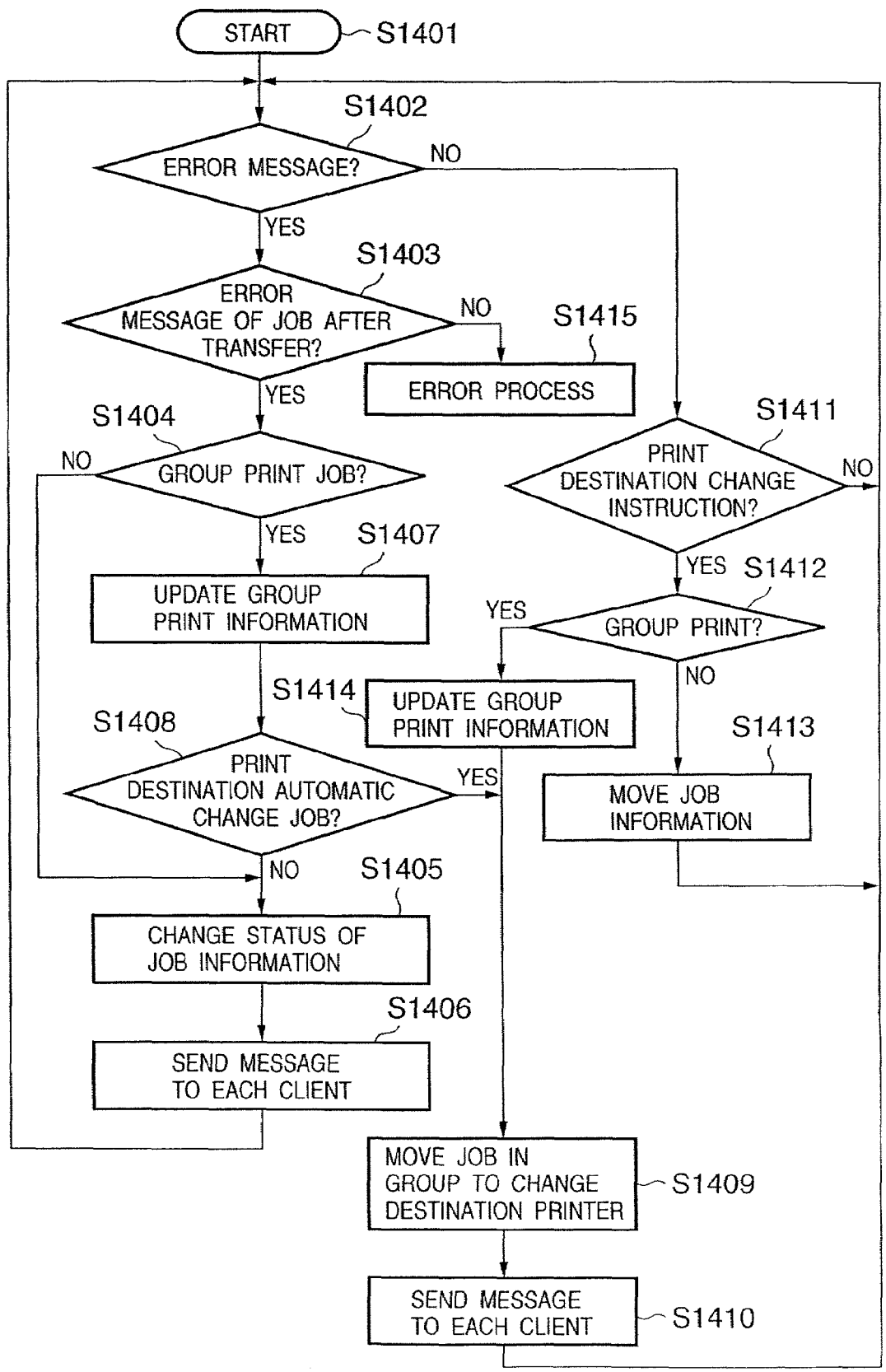
FIG. 14 is a flow chart showing an example of the fifth data processing sequence in the information processing apparatus according to the present invention.

FIG. 14 is a flow chart showing an example of the data processing sequence in the information processing apparatus according to the third embodiment of the present invention, and corresponds to the print destination change sequence by the server manager 611 in the print server 610. Note that S1401 to S1414 indicate steps. This embodiment will explain a process from a state after the print processes are made in the sequence of the first embodiment, and the print server waits for print confirmation messages.

If the print confirmation process starts in step S1401, the server manager 611 is set in a wait state in step S1402 in which it acquires status data of the printer 105 and print job based on a message from the printer 105, and receives a message from the client 601.

If the server manager 611 receives a print job error message from the printer 105 in step S1402, it checks in step S1403 if that error is an error of the job after data transfer. This checking may be done by directly acquiring status data from the printer 105. Also, when a normal print confirmation message of a given cannot be received (e.g., when an error has occurred in the printer 105 before the print confirmation message is received), a job error may be determined.

If an error of the job after transfer to the printer 105 is determined in step S1403, the server manager 611 searches for job information based on the informed job ID in step S1404 to check based on the job information if the job of interest is a group print job. If it is determined that the job of interest is not a group print job, the server manager 611 sets status of that print job to be "error" in step S1405, and sends a message to the client manager 605 of the client 600 that issued the print request of that job in step S1406. The flow then returns to step S1402 to wait for the next confirmation message.

If it is determined in step S1404 that the job of interest is a group print job, the server manager 611 sets the status of that print job in the group print information (GP-INFO) to be "error" in step S1407.

The server manager 611 checks in step S1408 if a change destination of the printer upon occurrence of an error is designated in the job. This checking process is done based on designation from the client upon occurrence of an error, as will be described later. Alternatively, the server manager 611 may check another destination by appending alternate printer name information to the group designation information shown in FIG. 8 in advance, and managing the alternate printer name in the group print information (GP-INFO) shown in FIG. 16.

If it is determined that a change destination of the printer is not designated in the job, the server manager 611 changes only the status data of the print job, and sends a message to the client manager 605 of the client 600 in steps S1405 and S1406. In this case, the print destination is changed after an instruction is received from the client manager 605 of the client 600.

On the other hand, if it is determined in step S1408 that the change destination printer upon occurrence of an error is designated in the job, the flow advances to step S1409, and the server manager 611 moves all pieces of job information in the group to list data of a printer as the change destination, e.g., the printer 650. Also, the server manager 611 moves management of the group print information (GP-INFO) to a group print information list of the new printer. In this case, the print server 611 automatically changes the spooled printer, and sends a message indicating a change in print destination to the client manager 605 of each client machine in step S1410. After the print destination has changed, jobs can undergo a group print process as in the first embodiment.

If it is determined in step S1402 that the received message is not an error message, it is checked in step S1411 if the received message is a print destination change instruction. If the received message is a print destination change instruction, the server manager 611 checks in step S1412 based on job information if the print job, which is designated to change the print destination from the client, is a group print job. If that job is not a group print job, the server manager 611 moves only the designated print job in step S1413; otherwise, the server manager 611 updates the group print information (GP-INFO) in step S1414. The flow then advances to steps S1409 and S1410 in turn, and the server manager 611 changes the output destination of all the print job in the group to the alternate printer as the change destination, and spools the job information of the print jobs in a print queue corresponding to that printer. If it is determined in step S1403 that the error message indicates an error other than that of a job after transfer, the server manager 611 executes a process corresponding to that error in step S1415.

Note that the printer as another print destination may be designated based on information such as a registry, INI file, or the like which is used to manage the printer by the print server, or a printer that can use the identical printer driver may be randomly designated. In this way, the printer may be designated by an arbitrary method as long as a printer that can normally print out documents can be designated. The process executed when the print destination of jobs is changed to another printer in accordance with user's instruction on the client 600 after the print confirmation message is received from the print server 610 upon occurrence of an error will be explained below.

Figure 15:
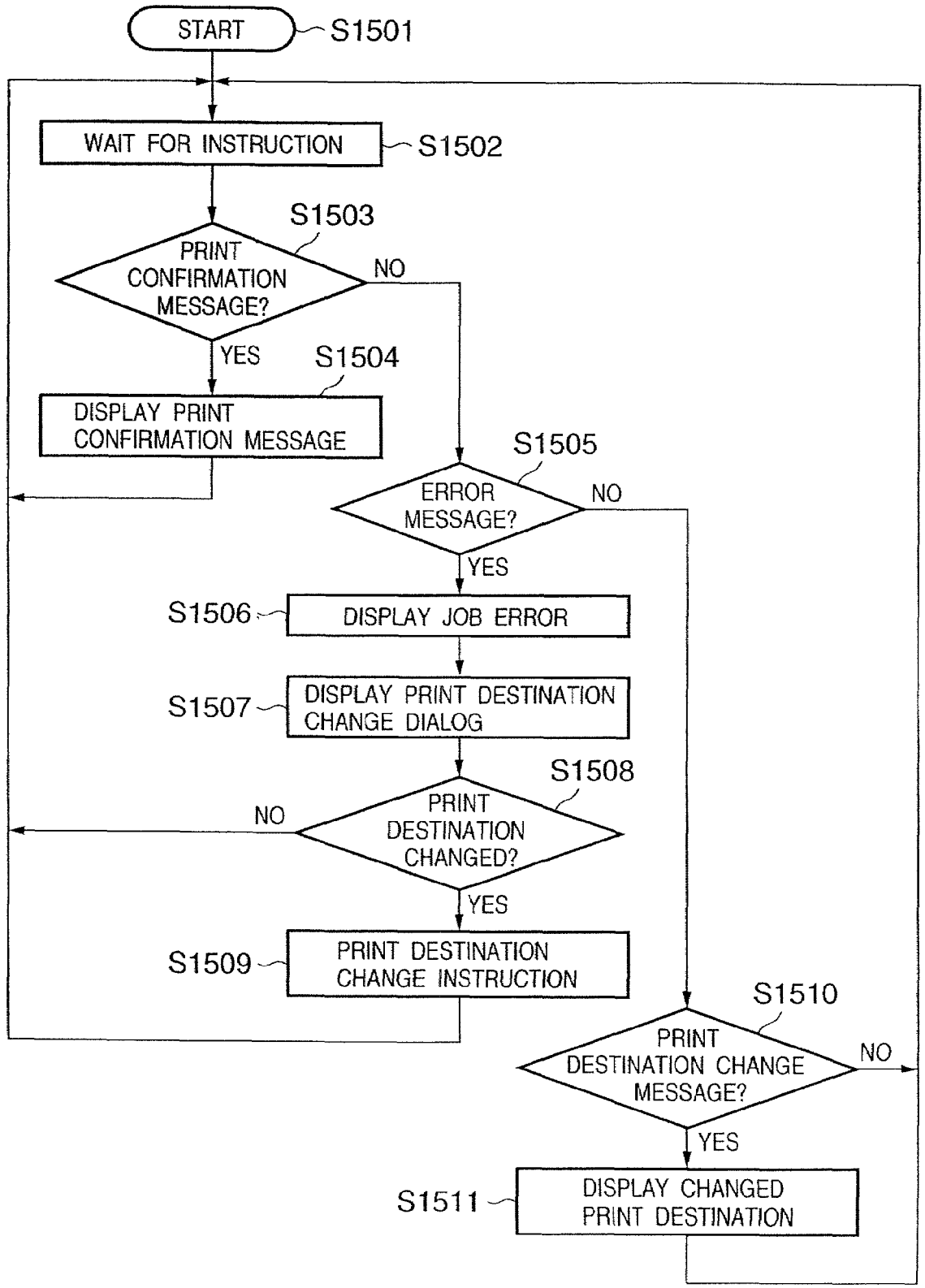
FIG. 15 is a flow chart showing an example of the sixth data processing sequence in the information processing apparatus according to the present invention.

FIG. 15 is a flow chart showing an example of the data processing sequence in the information processing apparatus according to the third embodiment of the present invention, and corresponds to the print confirmation process of the client manager 605 and the print destination change sequence (the print destination change sequence after reception of a job error message) of the group print process in the client manager 605. Note that S1501 to S1511 indicate steps.

If this process starts in step S1501 upon launching the client manager 605 or after the print process, the client manager 605 waits for an instruction in step S1502. Upon receiving any instruction from the server manager 611, the client manager 605 checks in step S1503 if the instruction is a print confirmation message. Note that the print confirmation message remains the same before and after the change in print destination.

If it is determined in step S1503 that the print confirmation message is received, the client manager 605 informs the user of the print confirmation message of a job by providing a graphical user interface window such as a print manager of Windows OS that shows a change in status or the like, and displaying that window on the display 207 via the OS in step S1504. After that, the flow returns to step S1502.

In case of a group print process, since job information is deleted after the informing process to the client, job information and group print information may be acquired from the server manager 611 of the print server 610, and special display indicating the end of print confirmation of the group print process may be made in the display process.

If it is determined in step S1503 that the received instruction is not a print confirmation message, the client manager 605 checks in step S1505 if the received instruction is an error message. If it is determined that the received instruction is an error message, the flow advances to step S1506, and the client manager 605 informs the user of the error by providing a dialog or the like indicating a job error and displaying that dialog on the display 207 via the OS. In this display, the client manager 605 may inform the user of a change in status of a print job like a print manager of Windows OS without displaying any special message.

After the error message is displayed, the client manager 605 provides a print destination change user interface (UI) such as a dialog box or the like, and displays it on the display 207 shown in FIG. 2 via the OS in step S1507.

The client manager 605 checks in step S1508 if the user has issued a print destination change instruction of the job. If it is determined that the print destination change instruction has been issued, the flow advances to step S1509, and the client manager 605 informs the server manager 611 of the server 610 of the change destination. After that, the flow returns to step S1502. Even for a group print job, another print destination need only be designated for a print job, the print destination of which is to be changed.

If the server manager 611 has changed the print destination, a print destination change message is received from the server manager 611. In this case, the flow advances from the instruction wait state in step S1502 to steps S1503 and S1505 in turn, and the client manager 605 checks in step S1510 if the received instruction is a print destination change message. If the received instruction is not a print destination change message, the flow returns to step S1502; otherwise, the flow advances to step S1511, and the client manager 605 informs the user of the changed print destination by displaying a dialog box or the like on the display 207 shown in FIG. 2. After that, the flow returns to step S1502.

In this case, since the print destination change process of a job is complete, only a change result is displayed.

Upon receiving the print destination change instruction from the client manager 605 of the client 600, the flow advances to steps S1402 and S1411 in turn on the server side. If it is determined that the received instruction is a print destination change instruction, the server manager 611 checks in step S1412 based on job information if the job, which is designated to change the print destination from the client, is a group print job. If that job is not a group print job, the server manager 611 moves only the designated job in step S1413; otherwise, the server manager 611 updates GP-INFO in step S1414. After that, the flow advances to steps S1409 and S1410 in turn to spool all jobs in the group in a print queue corresponding to the printer as the change destination.

When the print destination of a grouping job has been changed, the server manager 611 executes the following checking process.

The server manager 611 checks first if the printer as the changed print destination is a face-up or face-down printer. If the printer as the print destination is a face-down printer, since the print jobs can undergo print processes from the first one, the server manager 611 can control sending of print jobs in accordance with the print order of the group designation information (GP-INFO) managed in the group job management table 616. On the other hand, if the printer as the print destination is a face-up printer, print jobs must undergo print processes from the last one.

In case of the face-up printer, the page order in one print job can be maintained by spooling the print job in the printer and printing it from the last page. However, in case of a grouping job that groups a plurality of print jobs to handle them as a single print job, the jobs must be controlled to be sent from the last job in the print order of the group designation information. Hence, when the print destination has been changed to a face-up printer, the spool method is checked in turn from the last print job in the print order designated by the group designation information. If it is determined that the server spooler 612 is used, the print job spooled in the server spooler is sent; if it is determined that the client spooler 606 is used, clear to send information is sent to the client manager 605 of the client that issued the print request of the print job to be printed.

When the print destination has been changed from a face-up printer to a face-down printer, the server manager 611 need only make send control in the normal print order in place of the reversed print order. With this control, even when the print destination has been changed to a printer with a different paper output method, the print process that can maintain the paper output order of the grouping job can be executed.

Note that a change in print destination can be designated from every clients. When another client that requested a print job included in a group has issued an instruction first, only display of a change result is made in the remaining clients as in the print destination automatic change process of the print server.

With the above sequence, when the print server 611 cannot proceed to execute a print process due to, e.g., an error of the printer 105 before the end of print processes of all jobs in the group is confirmed, the print destination can be automatically changed to another print destination designated as a default or the print destination can be changed in accordance with an instruction from the client manager 605 of the client 600.

Fourth Embodiment

The fourth embodiment of the present invention will be described below. In this embodiment, when the information processing apparatus of the present invention is instructed to execute a shut-down (power-OFF) process while a print job is spooled in the spooler, the apparatus transfers that print job to another machine so that the print job can normally undergo a print process, and then shuts it down.

Figure 21:
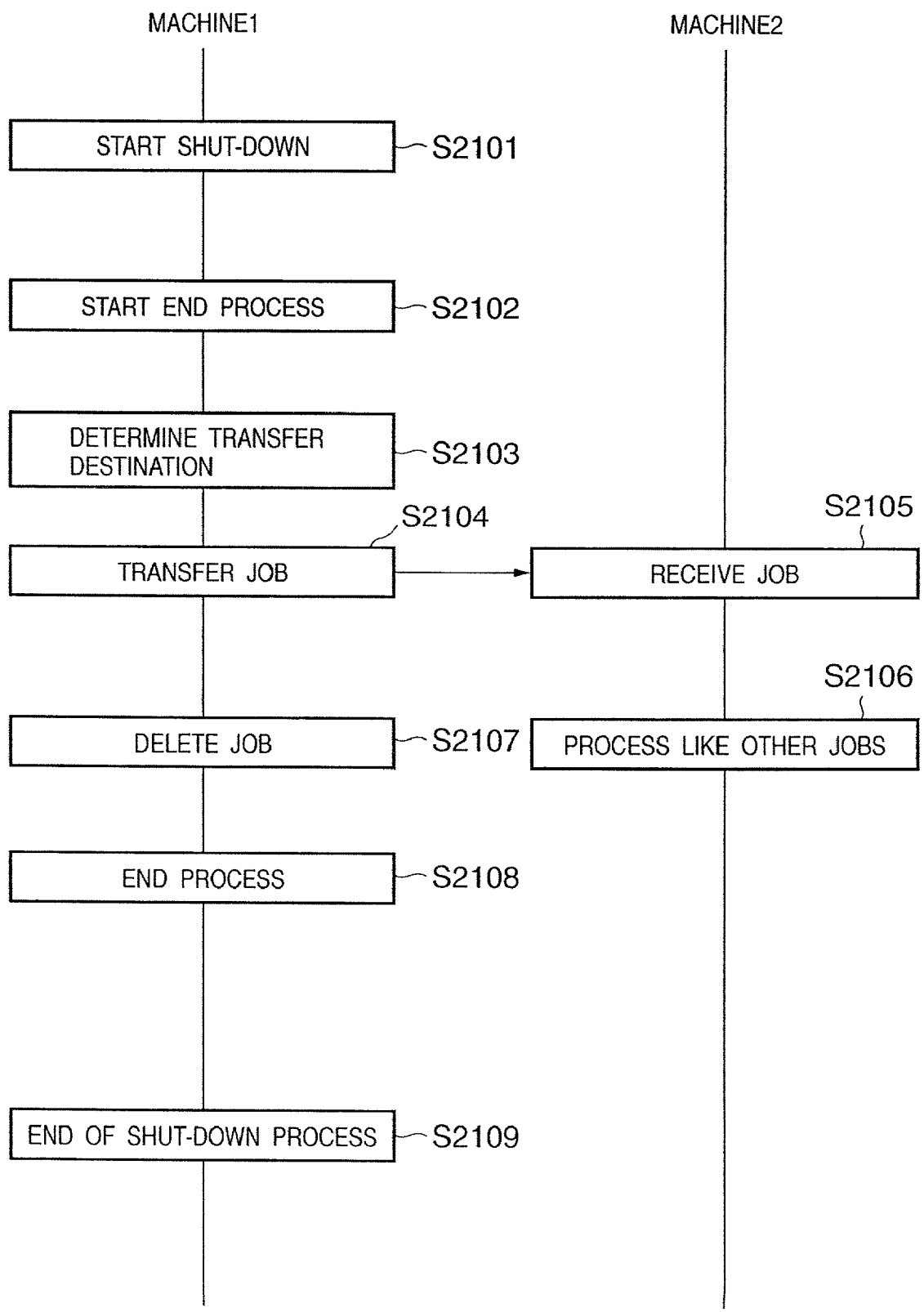
FIG. 21 is a sequence chart for explaining the overall process in the fourth embodiment of the present invention.

FIG. 21 is a sequence chart showing the processing sequence of machine 1 which transfers a print job, and machine 2 which takes over the transferred print job. In this embodiment, machines 1 and 2 can be either a print server or client.

Referring to FIG. 21, machine 1 holds a print job in its internal spooler (client spooler 606 or server spooler 612). This print job may be spooled either as raw data that the printer can directly render and print, or in a file format, such as EMF of Windows OS, that the printer driver can further convert it into another page description language.

Assume that machine 1 is instructed to execute an end process such as a shut-down process in Windows OS, while the job is spooled. When the shut-down process starts (step S2101), the OS instructs the client or server manager to end its process. The client or server manager starts an end process in response to the end process (step S2102). When the client or server manager detects that the print job is spooled in the spooler, it determines the transfer destination of the job as machine 2 as the information processing apparatus of the present invention with reference to a pre-registered information table of machines to which the job can be transferred (step S2103).

The client or server manager transfers the print job to machine 2 (step S2104). If transfer has succeeded, machine 1 deletes the job (step S2107), and proceeds to execute its end process (step S2108), thus completing the shut-down process (step S2109).

On the other hand, machine 2 to which the print job is transferred receives that job (step S2105), and executes a send process in the same manner as other print jobs in machine 2, i.e., as a print job spooled therein (step S2106). More specifically, if machine 2 is a print server, it spools the print job in the server spooler; if machine 2 is the client, it processes that job in the same manner as jobs, the print requests of which were received from the application. If the print job to be transferred is the one selected with client spool, since the print request and job information have already been sent to the print server, a change message of the job location is sent to that print server. Or if machine 2 as the transfer destination of the job is the print server to which the job information was sent previously, the spool method (707) in the job information is changed to server spool. If the transfer destination is another print server, job information in the print server to which the job information was sent previously is deleted.

On the other hand, if the print job to be transferred is a server-spooled print job, machine 2 as the transfer destination is also a print server. In this case, job information of a client-spooled print job is transferred in the same manner as the server-spooled print job. Then, a message indicating that the print server has been changed is sent to the request source client of the transferred print job, if necessary.

Figure 22:
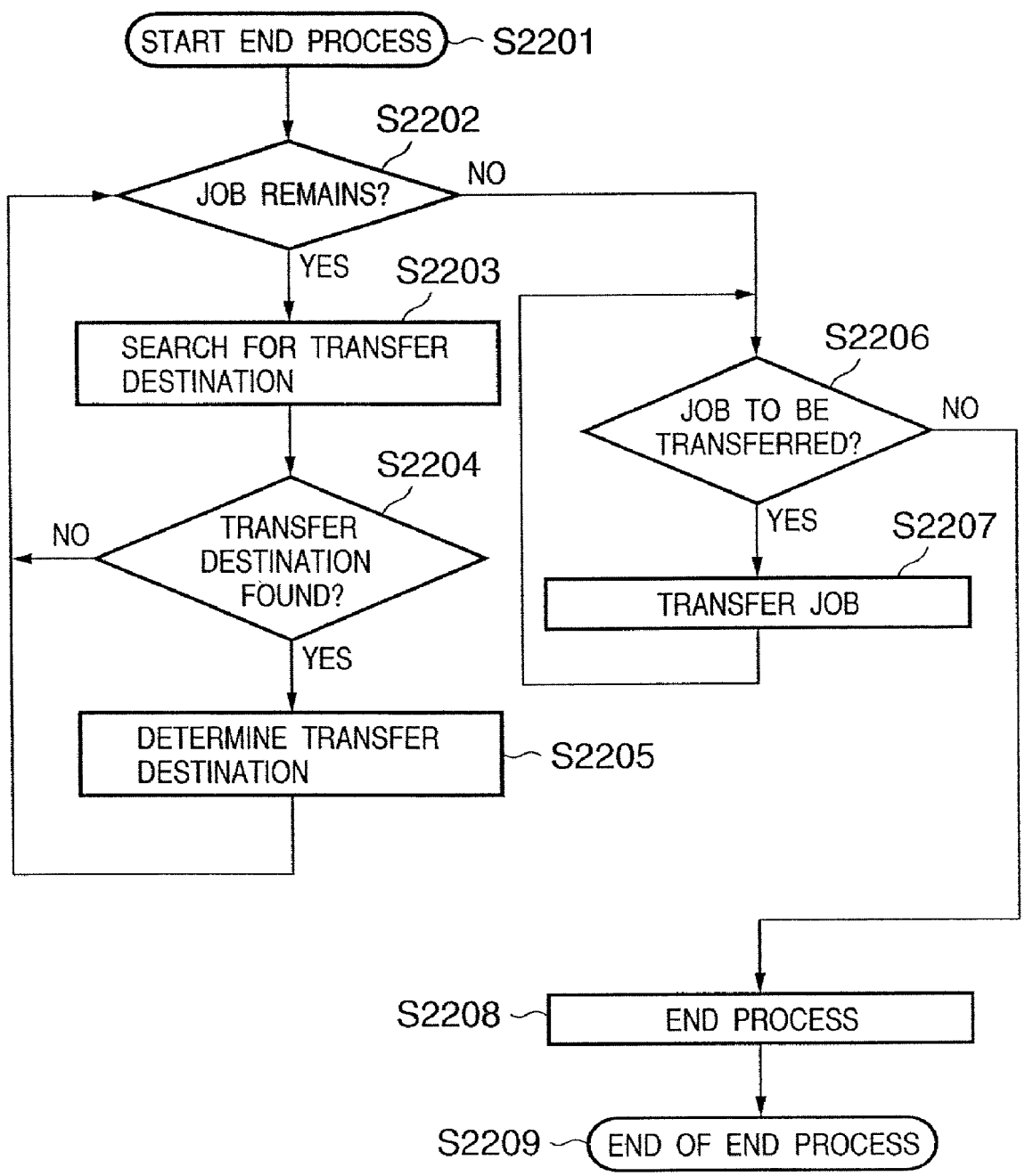
FIG. 22 is a flow chart showing the process of machine 1 in FIG. 21.

The processing sequence of machine 1 in this embodiment will be described below using the flow chart in FIG. 22.

If machine 1 starts an end process in response to a shut-down instruction in step S2201, the spooler (and job management table) is searched in step S2202 to check if a print job to be processed remains. If it is detected that non-processed print jobs remain, a transfer destination machine table, which is designated in advance by the user using, e.g., a UI or the like, is searched for a machine on which a print control program having a function equivalent to that of machine 1 can run (step S2203).

As a result of a search, if a client to which the job can be transferred is found, the transfer destination is recorded for each job. In this recording method, the transfer destination may be added to job information for each job to be transferred, or a table that indicates a list of IDs of jobs to be transferred and the transfer destination clients may be generated.

Since the transfer destination of each job may differ or the print conditions of each individual job may not be met (some conditions required to proceed to execute and complete the print process are not met, e.g., the transfer method to the printer is different, the print confirmation mechanism is different, image data cannot be processed, and so forth) in association of jobs which are to undergo a group print process, even if a transfer destination suitable for a given job cannot be found in step S2204, the flow returns to step S2202 to individually inquire the transfer destinations of all jobs.

If it is determined in step S2202 that a job whose transfer destination is not determined is not found, the job whose transfer destination is determined is checked in step S2206, and a transfer process is done to the transfer destination of each job in step S2207. The checking process in step S2206 and the transfer process in step S2207 are repeated until all jobs are transferred. If no more transfer job whose transfer destination is determined is found in step S2206, the flow jumps to step S2208 to execute the end process of the print system itself. In step S2209, the end process of this embodiment comes to an end. At this time, a job whose transfer destination cannot be determined may be deleted by the print system or may be registered in the spooler again after restart like the Windows spooler.

Figure 23:
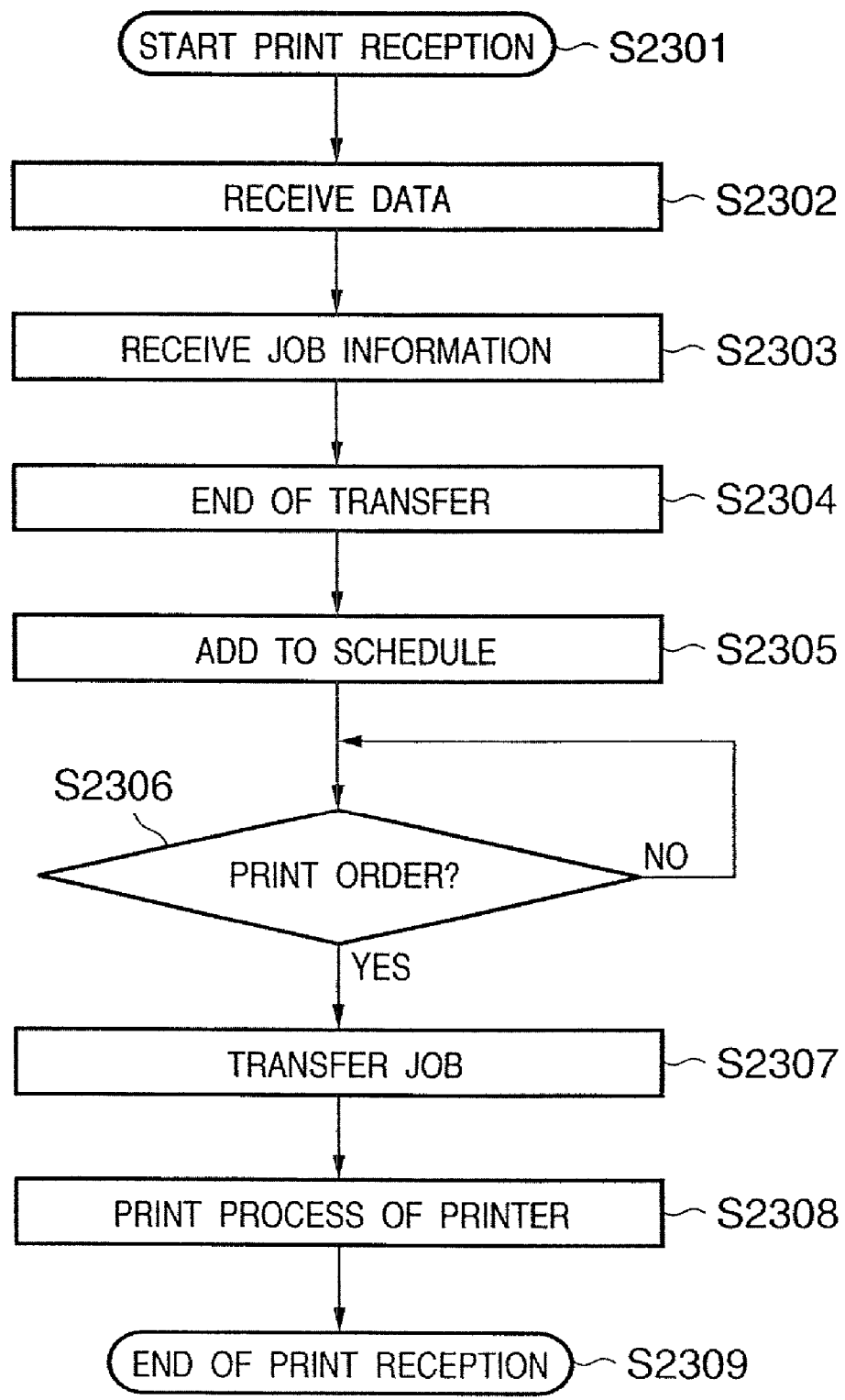
FIG. 23 is a flow chart showing the process of machine 2 in FIG. 21.

The process of machine 2 that receives a job will be explained below using FIG. 23.

If a job send process from machine 1 is done in step S2301, machine 2 receives print data of the job in step S2302. In step S2303, machine 2 receives job information. Upon completion of transfer of the print data and job information, the transfer process ends in step S2304.

The flow advances to step S2305, and the received print job is added to the schedule of the spooler of machine 2. In this sequence, after reliable data is received, the job is added to the spooler. Alternatively, after job management information is added to the schedule, print data may be received. If there is no job to be sent to a printer in step S2306, the spooler to which the job is added immediately transfers the job to that printer. On the other hand, if other jobs have already been spooled, the job is transferred to the printer in step S2307 after all jobs present before that job is added to the schedule are despooled and the print turn of the received job is reached.

In step S2308, the printer executes a print process, thus ending the reception print process of machine 2. At this time, the schedule of the spooler and the transfer order relationship with other jobs may be determined based on priority or the like as in, e.g., the Windows spooler, and the received job need not always be transferred after all jobs present before it is scheduled are transferred. Also, the spool format and the transfer method to the printer are not particularly limited as long as the printer can print.

In this embodiment, a transfer destination machine is determined from the transfer destination machine table or the like, which is designated in advance. If the transfer destination machine has transfer means to a plurality of printers (e.g., that machine has print means for a plurality of printers like shared printers of Windows OS), information that specifies not only the transfer destination machine but also the transfer destination printer may be designated at the same time.

Furthermore, the transfer destination machine is determined according to user's instruction. Alternatively, the transfer destination machine may be acquired from a server machine having a designated database or the network may be searched to automatically determine the transfer destination machine. Moreover, the transfer destination of a job may be determined after operation confirmation prior to transfer of the job.

In the above description, all non-processed jobs are sent to an identical transfer destination, but transfer destinations may be determined for respective jobs. In this case, a transfer destination is searched for each non-processed job, the presence/absence of a transfer destination is recorded for each job, and after only jobs whose transfer destinations are determined are transferred, the aforementioned error process may be executed for jobs whose transfer destinations cannot be found.

Fifth Embodiment

An information processing apparatus according to the fifth embodiment of the present invention will be described below.

Figure 24:
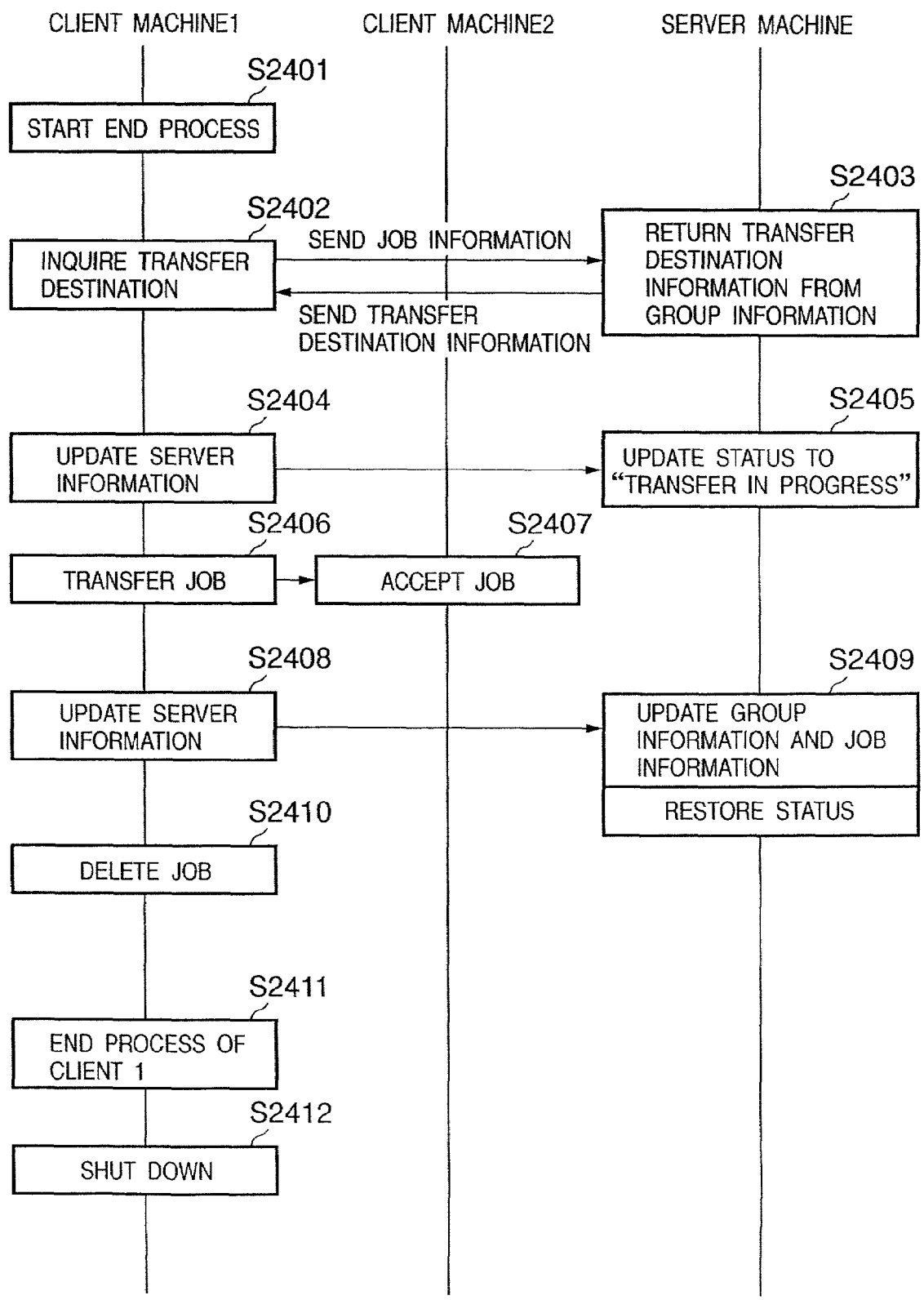
FIG. 24 is a sequence chart for explaining the overall process in the fifth embodiment of the present invention.

FIG. 24 is a sequence chart showing a spool destination change sequence executed when a client machine having client-spooled group print jobs, which are not processed yet, is to end.

Figure 25:
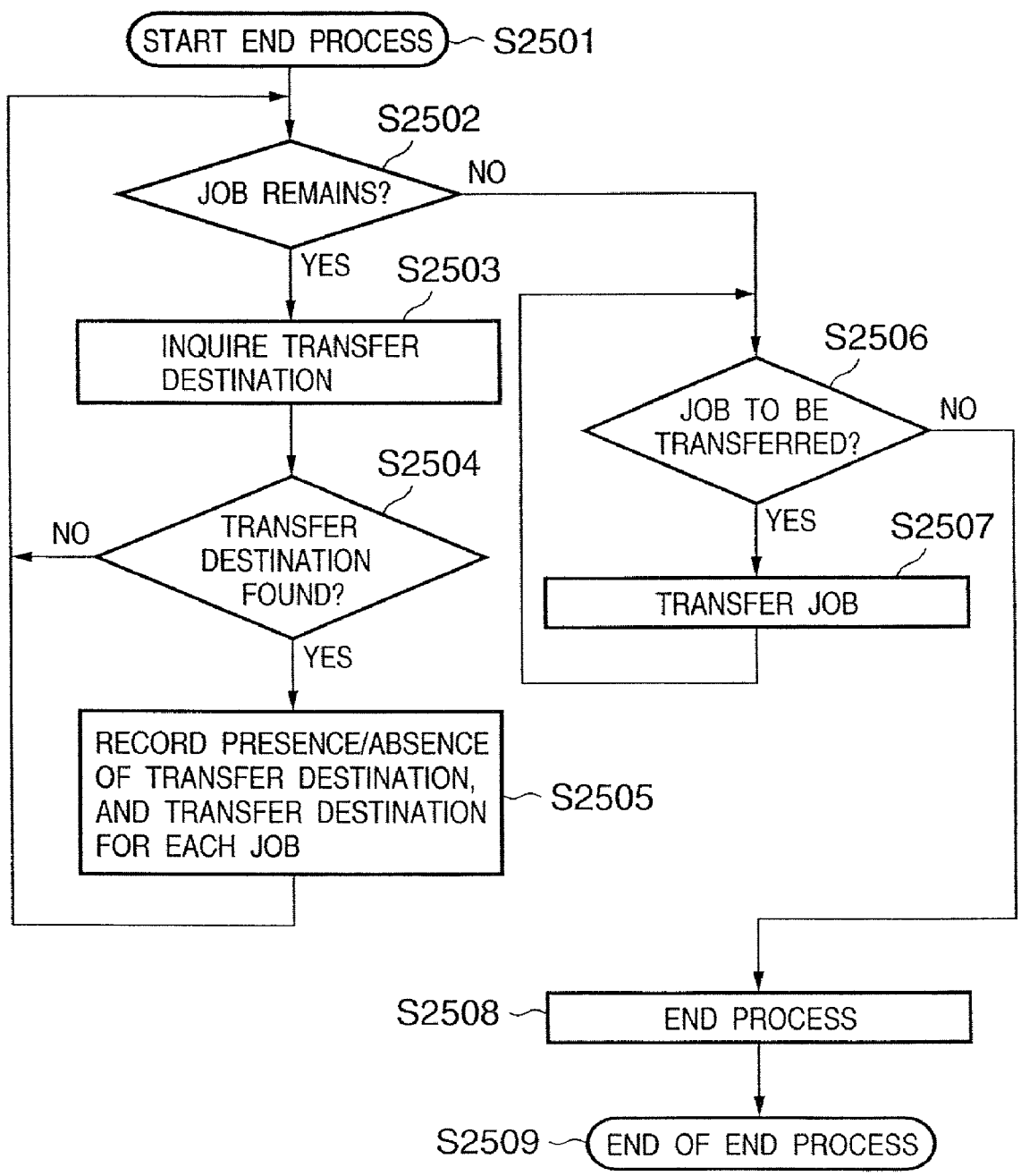
FIG. 25 is a flow chart showing the process of client machine 1 in FIG. 24.
Figure 26:
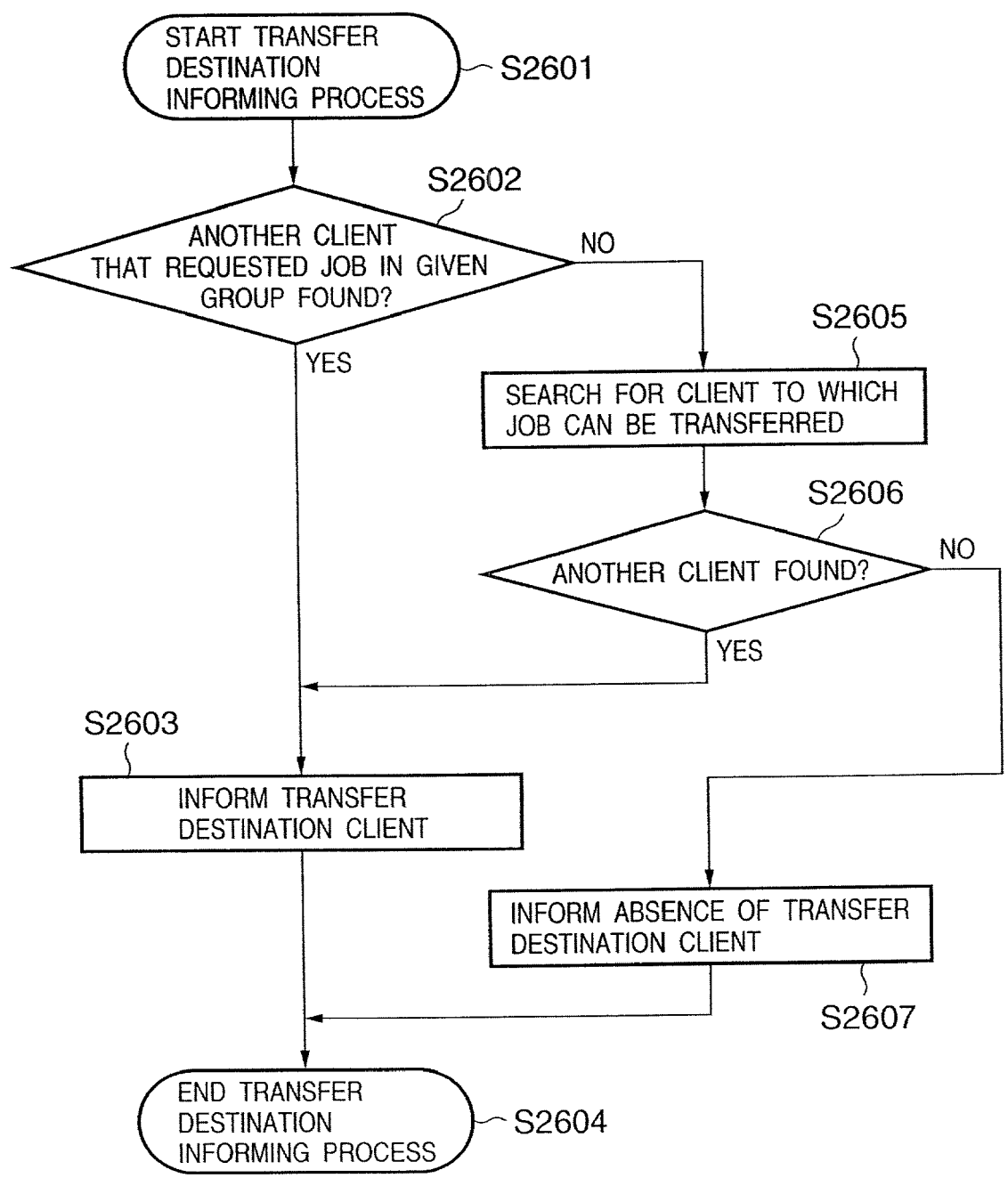
FIG. 26 is a flow chart showing the sequence for determining the transfer destination by a server machine in the fifth embodiment of the present invention.
Figure 27:
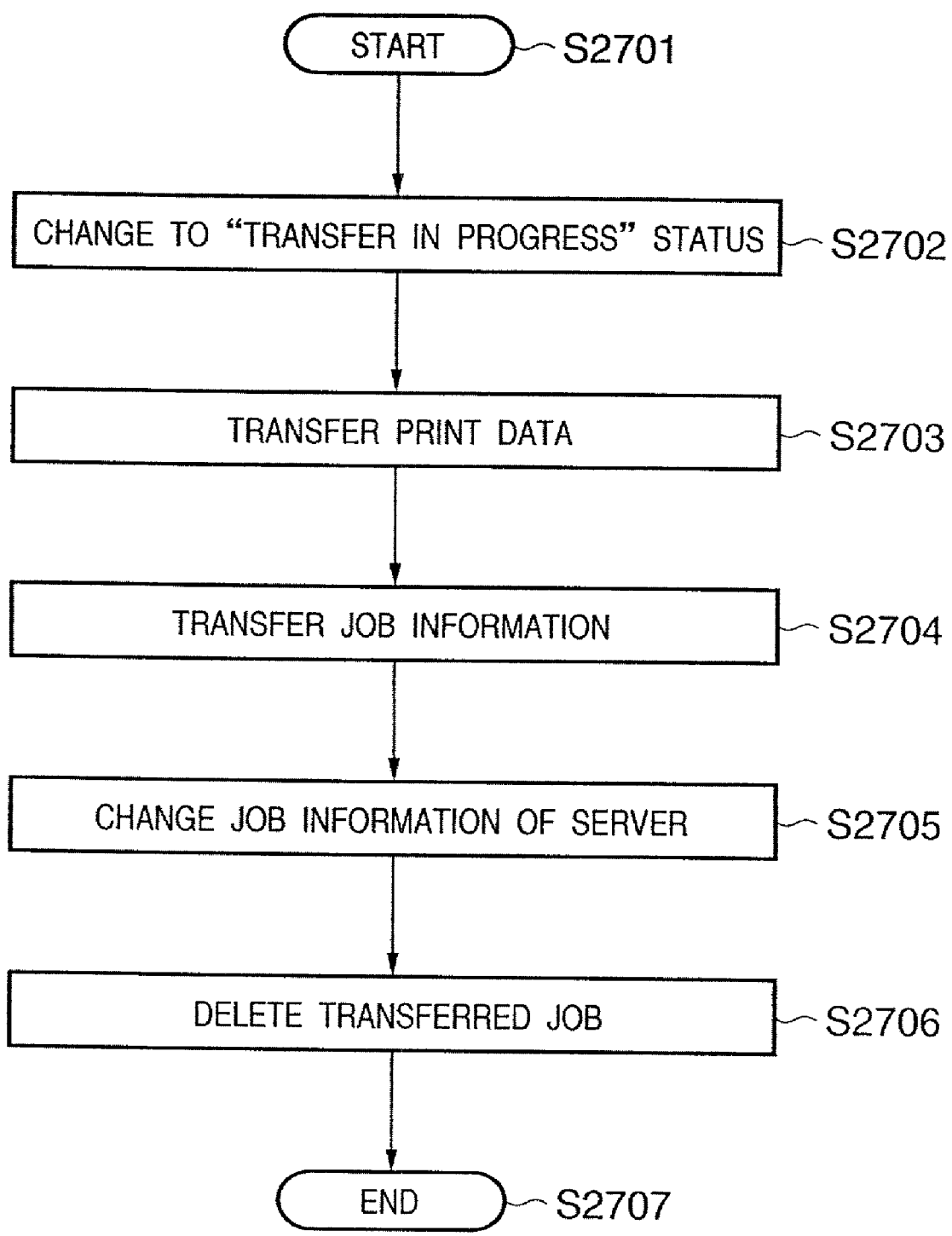
FIG. 27 is a flow chart showing details of the job transfer process in FIG. 25.
Figure 28:
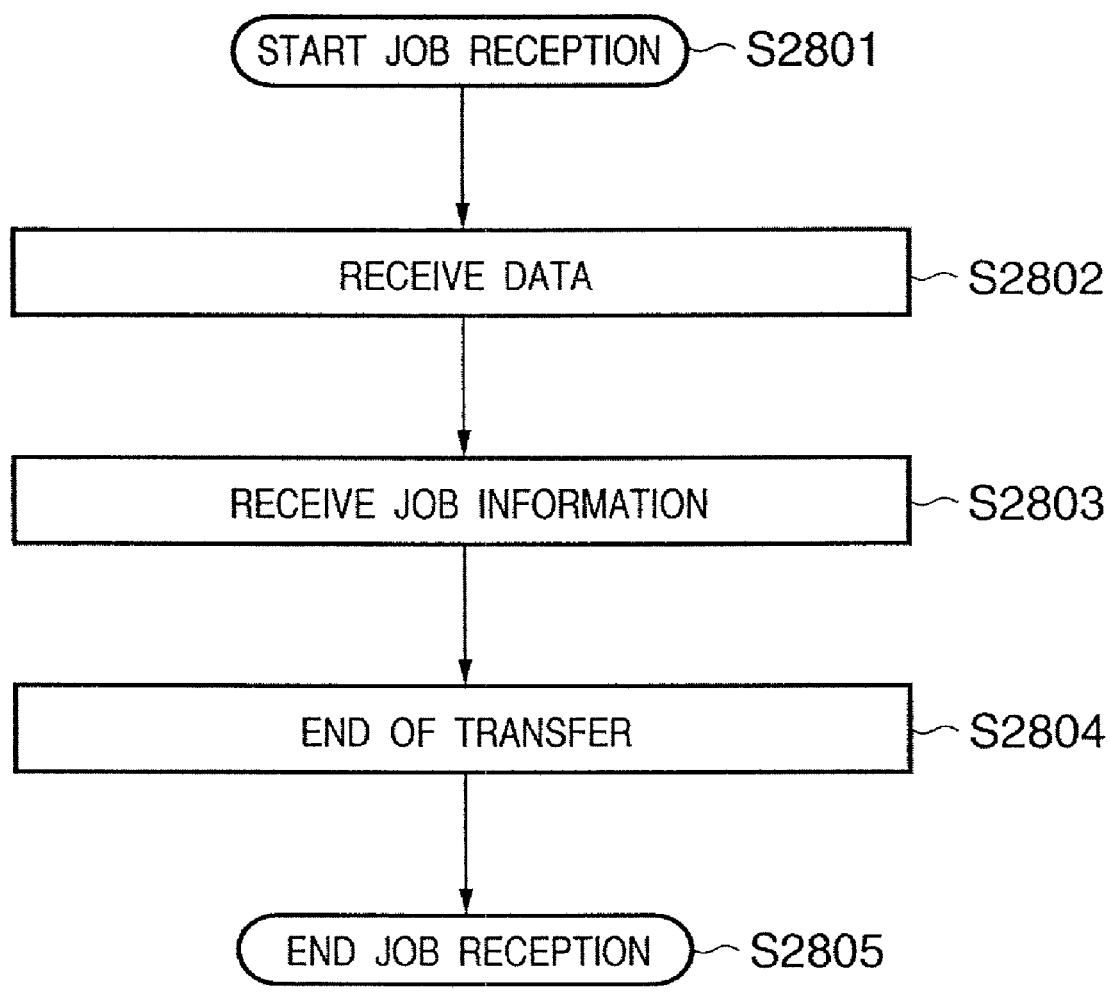
FIG. 28 is a flow chart showing the process of client machine 2 in FIG. 24.
Figure 29:
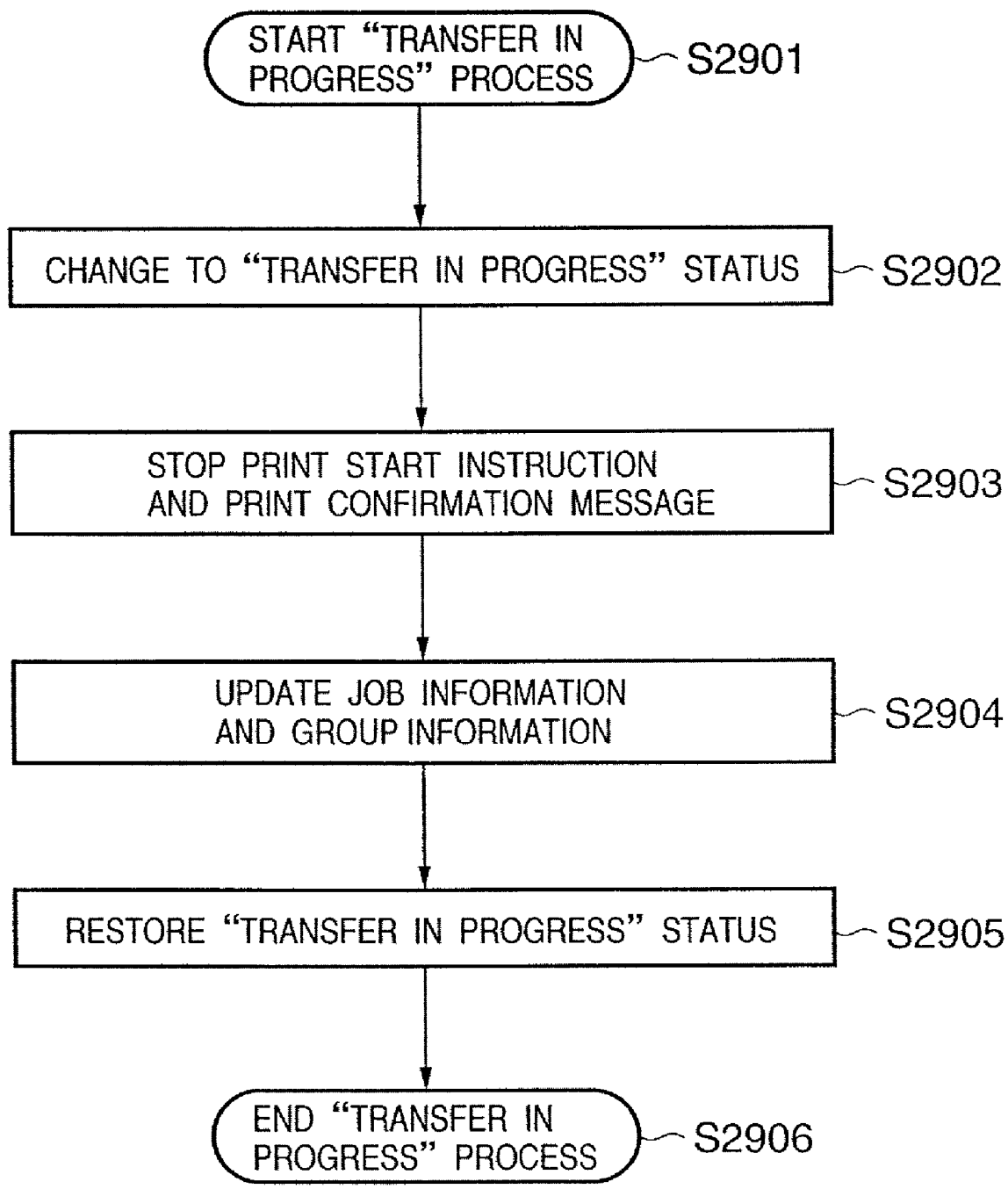
FIG. 29 is a flow chart showing the process for updating job information and group information of a job which is being currently transferred by the server machine in the fifth embodiment of the present invention.

FIG. 25 is a flow chart showing the end process of client machine 1, FIG. 26 is a flow chart showing the sequence executed when a print server that received a transfer destination inquiry from client machine 1 instructs the transfer destination, FIG. 27 is a flow chart showing the job transfer process of client machine 1, FIG. 28 is a flow chart showing the job reception process of client machine 2, and FIG. 29 is a flow chart showing the process of the server during job transfer.

Schematic sequences of processes of client machines 1 and 2 and a print server in this embodiment will be explained first using FIG. 24.

Referring to FIG. 24, if an end process of a client on client machine 1 starts due to a shut-down process of Windows OS (step S2401) while jobs of the print scheme described in the first embodiment of the present invention still remain, the client manager 605 on client machine 1 inquires of the server manager 611 about a transfer destination of jobs (step S2402).

The server manager 611 searches for a client machine that has issued the request of a job in an identical group, and informs the client manager 605 of the found client machine (to be referred to as client machine 2 hereinafter) as the transfer destination (step S2403). In response to this information, the client manager 605 on client machine 1 updates job information on the print server to "transfer in progress" status (steps S2404 and S2405), and transfers jobs to the client manager on client machine 2 (step S2406). The client manager on client machine 2 accepts the transferred print jobs (step S2407).

Upon normal completion of transfer, the client manager 605 on client machine 1 updates the group print information of the print server 611 using group designation information, so that the transferred print jobs are handled as those of client machine 2, and also updates job information to indicate jobs of client machine 2 (steps S2408 and S2409). The server machine restores "transfer in progress" status of the jobs to "ready to print" (restores to previous status in case of other status data).

The transferred job is deleted (step S2410), and upon completion of transfer of all jobs, the required end process of the client is executed (step S2411). Upon completion of the end process, the power supply is turned off (step S2412), thus ending the process of the fifth embodiment of the present invention.

The processing sequences of respective machines in the fifth embodiment of the present invention will be described in detail below using FIGS. 25, 26, 27, and 28.

The process of client machine 1 will be described below using the flow chart in FIG. 25. Referring to FIG. 25, if client 1 starts an end process in step S2501, the client checks in step S2502 if jobs which are waiting for start of a print process or for print confirmation in the group print process remain. If group print jobs remain, client 1 inquires of the print server about a client as the transfer destination in step S2503.

As a result of the inquiry, if a client to which jobs can be transferred is found, the transfer destination is recorded for each job. In this recording method, the transfer destination may be added to job information for each job to be transferred, or a table that indicates a list of IDs of jobs to be transferred and the transfer destination clients may be generated. Since the transfer destination may differ in association with jobs which are to undergo a group print process, even if a transfer destination suitable for a given job is not found in step S2504, the flow returns to step S2502 to inquire transfer destinations of all jobs.

If no more job whose transfer destination is inquired is found in step S2502, each job whose transfer destination is determined is checked in step S2506, and a transfer process is done to the transfer destination of each job in step S2507. The checking process in step S2506 and the transfer process in step S2507 are repeated until all jobs are transferred. If no more transfer job whose transfer destination is determined is found in step S2506, the flow jumps to step S2508 to execute the end process of the print system itself. In step S2509, the end process of this embodiment comes to an end.

In this embodiment, if no transfer destination of a given job is found in step S2503 like in a case wherein no environment that can assure a normal print process is available, the user may determine the process of such job like in the error process in the fourth embodiment, the job may be automatically deleted, or the job may be registered in the spooler again after restart of the information processing apparatus like in, e.g., the Windows spooler.

The transfer destination informing process of the server machine in response to the inquiry in step S2503 in FIG. 25 will be explained below using the flow chart shown in FIG. 26.

Upon receiving a transfer destination informing request from the client 1 in step S2601, the server machine searches the group information for another client machine which has issued a request of a job in the identical group (step S2602). If another client machine which has issued a request of a job in the identical group is found in step S2602, the server machine informs client 1 of that client machine in step S2603, and the flow advances to step S2604, thus ending the transfer destination informing process.

However, if no client machine which has issued a request of a job in the identical group is found in step S2602 or if such client has already been shut down if it is found and, hence, jobs cannot be transferred, another client machine on the network is searched for by broadcasting or multicasting, e.g., a UDP packet in step S2605.

If a client machine to which jobs can be transferred is found in the search processes in steps S2605 and S2606, the flow advances to step S2603 to inform the transfer destination client. If no transfer destination client is found in the search process in step S2606, the server machines informs the client of the absence of a transfer destination client, and ends the transfer destination informing process. If no transfer destination client is found, and if the server machine has a client spool function equivalent to the client machine, the server machine may inform the client of itself as the transfer destination. In this case, the process of client machine 1 can be substantially the same as that in the sequence upon transferring jobs to client machine 2, except that the destination is changed to the server machine. In this case, the server machine receives a print request and corresponding print job at different timings, and sends that print job to a printer as the self print spool process.

The job transfer process done by client machine 1 in step S2507 in FIG. 25 will be described in more detail below using the flow chart shown in FIG. 27.

If the job transfer process starts in step S2701, status in the group job management table in the client machine and server machine is changed to "transfer in progress" status in step S2702. Job data is transferred in step S2703, and job information is transferred in step S2704.

Upon completion of the job transfer process, information such as the machine name of job information, the client machine name of group information, and the like in the server are changed to that of the client machine as the transfer destination in step S2705. Upon normal completion of job transfer and information change processes, client machine 1 deletes the transferred job and its job information in step S2706, and ends the transfer process in step S2707.

The job reception process of client machine 2 which receives a job in this embodiment will be described below using the flow chart shown in FIG. 28.

Upon receiving a job transfer process start message from client machine 1 in step S2801, print data of a job is received in step S2802. The flow then advances to step S2803 to receive job information. At this time, as new job information of client machine 2, information such as the machine name which holds the job, and the like is changed to information corresponding to client machine 2. Upon completion of the transfer process in step S2804, client machine 2 has spooled a new client-spooled print job, i.e., a job which waits a print start instruction (print permission information) from the server machine, thus ending the job reception process. Upon receiving print permission information from the server machine, client machine 2 sends the non-processed print job received from client machine 1 to a printer as the self spooled print job.

The process in the server machine when client machine 1 transfers a job in step S2507 in FIG. 25 will be explained below using the flow chart shown in FIG. 29.

If the job transfer process from client machine 1 to client machine 2 starts in step S2901, status data in the job management table present on the server machine, which corresponds to a job, transfer of which is in progress, is changed from "ready to print" to "transfer in progress"

status in step S2902 corresponding to the process in step S2702. For the job which has been changed to "transfer in progress" status, the server machine stops a print start instruction or a print confirmation informing process to the client machine in step S2903.

Upon completion of the transfer process, the update process of job information and group information of the job that has been transferred is done by client machine 1 in step S2705 in FIG. 27, and those pieces of information on the server machine are changed to allow to handle the job as that of client machine 2 in step S2904 in correspondence with the process in step S2705. Finally, "transfer in progress" status in the group job management table is restored to "ready to print" status, thus ending the process of the server machine during job transfer.

With the aforementioned sequence, the fifth embodiment of the present invention can be implemented.

Other Embodiments

In the above embodiments, a network printer has been exemplified. However, the present invention is not limited to network printers, and arbitrary printers such as a printer locally connected to a print server may be used as long as the print server can send data to these printers and can acquire their status information.

The present invention can be applied to either a case wherein only job information is spooled like a virtual print server system or a case wherein the network printer includes a print server function.

According to each of the above embodiments, even when a plurality of clients issue print requests of a plurality of jobs at arbitrary timings, their print processes can be done together by a given printer in the designated order. Also, each client PC that issued a job can confirm if combined print processes of all jobs are complete. Furthermore, when it cannot be confirmed if combined print processes of jobs are complete, the print destination printer can be changed to execute the combined print processes of a plurality of jobs.

The format of a data processing program which can be read out by a print system to which the information processing apparatus according to the present invention can be applied will be explained below with reference to the memory map shown in FIG. 20.

FIG. 20 is a view for explaining the memory map of a storage medium which stores various data processing programs which can be read out by a print system to which the information processing apparatus according to the present invention can be applied.

Although not shown, information used to manage programs stored in the storage medium, e.g., version information, creator, and the like may be stored, and information depending on an OS or the like on the program read-out side, e.g., icons and the like used to identifiably display programs may be stored.

Data that depend on various programs are also managed in the above directory. When a program used to install various programs in a computer is compressed, a program used to decompress such program may also be stored.

The functions shown in FIGS. 10 to 15, FIG. 22, FIG. 23, and FIGS. 25 to 29 in the above embodiments may be implemented by a host computer on the basis of externally installed programs. In this case, the present invention can be applied to a case wherein an information group including programs is supplied from a storage medium such as a CD-ROM, flash memory, FD, or the like or from an external storage medium via a network to an output apparatus.

As described above, the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, CD-RW, DVD, magnetic tape, nonvolatile memory card, ROM, EEPROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, since print control is made after all of a plurality of print jobs to be grouped, print requests of which have been issued from a plurality clients, are ready to print, even when a normal print job is spooled in a print server together, a given printer can undergo print control so as not to execute a print process of the normal print job within a group print job.

Since the client can spool print jobs, the load on the network and printer server can be reduced, print jobs spooled in the client and those spooled in the print server can be grouped, and print jobs can be sent in turn in accordance with the print order.

Even when print confirmation for each print job is acquired from a printer, the combined print and paper output results of print jobs, print processes of which are complete, can be confirmed, and a combined print message can be sent to the clients of respective print jobs. When print jobs cannot undergo a print process due to a printer error, the print destination of those jobs can be changed to another designated printer.

Even when the print destination is changed to a printer with a different paper output face, since the printer processes print jobs in the order they are received, print control that can maintain the required print order of a grouping job can be achieved.

Therefore, even when print jobs are received in turn in an order different from the print order, they can be desirably arranged in a designated order, and can undergo successive print processes from a single printer in an order that the user wants. In addition, errors during print processes of the printer can be flexibly coped with. Hence, the print order mode of print jobs of the printer can be expanded, and the print function process of the printer can be greatly improved.

A print job which is to undergo a print process can be added to a group print job that has already been managed in a management server.

Upon issuing a print request from a client, the user can designate a new grouping job of print jobs from a plurality of clients to be grouped.

When a print job is to be included in a group print job that has already been managed in the management server, the user can easily designate a group name and printer order using a graphical user interface.

Even when the shut-down process is executed while a non-processed job is spooled, a job that can be transferred is transferred to another machine to proceed to execute its process, thus allowing reliable print control.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A client apparatus for managing a print job sent to a printer, comprising:
   an incomplete job detection unit configured to, in response to an operation end-process request instructed by an operating system to shut down said client apparatus, detect if an incomplete group print job, which has already been issued and a process of which is not completed yet, is present in said client apparatus;
   an alternate apparatus determination unit configured to, when the incomplete group print job is detected in said client apparatus, determine an alternate client apparatus, which has issued a print job in the incomplete group print job, to alternately manage the incomplete group print job;
   a transfer unit configured to transfer the incomplete group print job, detected by said incomplete job detection unit, to the alternate client apparatus determined by said alternate apparatus determining unit; and
   an end unit configured to execute the operation end process after completion of the transfer of the incomplete group print job.

2. The apparatus according to claim 1, wherein said alternate apparatus determination unit determines the alternate client apparatus using a database unit which resides in a server machine and stores information that pertains to said alternate client apparatus.

3. The apparatus according to claim 1, wherein said alternate apparatus determination unit determines the alternate client apparatus on the basis of information acquired from another client apparatus to which said client apparatus is connected to be able to communicate with each other.

4. The apparatus according to claim 1, wherein, when a plurality of incomplete print jobs are present in the incomplete group print job, said alternate apparatus determination unit determines the alternate client apparatus for each of the plurality of incomplete print jobs.

5. The apparatus according to claim 1, wherein said transfer unit sends at least one of information indicating that the transfer is in progress, information indicating that the transfer is complete, and information that pertains to the alternate client apparatus, to another predetermined client apparatus which is connected to said client apparatus to be able to communicate with each other.

6. The apparatus according to claim 1, wherein said determination unit determines the alternate client apparatus based on a search result by a server machine.

7. A method of controlling a client apparatus for managing a print job sent to a printer, comprising:
   an incomplete job detection step of detecting, in response to an operation end-process request instructed by an operating system to shut down said client apparatus, if an incomplete group print job, which has already been issued and a process of which is not completed yet, is present in said client apparatus;
   an alternate apparatus determination step of determining, when the incomplete group print job is detected in said client apparatus, an alternate client apparatus, which has issued a print job in the incomplete group print job, to alternately manage the incomplete group print job;
   a transfer step of transferring the incomplete group print job, detected in said incomplete job detection step, to the alternate client apparatus determined in said alternate apparatus determination step; and
   an end step of executing the operation end process after completion of the transfer of the incomplete print job.

8. The method according to claim 7, wherein the alternate apparatus determination step includes the step of determining the alternate client apparatus using a database unit which resides in a server machine and stores information that pertains to said alternate client apparatus.

9. The method according to claim 7, wherein the alternate apparatus determination step includes the step of determining the alternate client apparatus on the basis of information acquired from another client apparatus to which the client apparatus is connected to be able to communicate with each other.

10. The method according to claim 7, wherein, when a plurality of incomplete print jobs are present in the incomplete group print job, the alternate apparatus determination step includes the step of determining the alternate client apparatus for each of the plurality of incomplete print jobs.

11. The method according to claim 7, wherein the transfer step includes the step of sending at least one of information indicating that the transfer is in progress, information indicating that the transfer is complete, and information that pertains to the alternate client apparatus to another predetermined client apparatus which is connected to said client apparatus to be able to communicate with each other.

12. The method according to claim 7, wherein said alternate apparatus determination step determines the alternate client apparatus based on a search result by a server machine.

13. A computer readable storage medium which stores a computer program which implements a method of controlling a client apparatus, said computer program comprising:
   an incomplete job detection program module for detecting, in response to an operation end-process request instructed by an operating system to shut down said client apparatus if an incomplete group print job, which has already been issued and a process of which is not completed yet, is present in the client apparatus;
   an alternate apparatus determination program module for, when the incomplete group print job is detected in said client apparatus, determining an alternate client apparatus, which has issued a print job in the incomplete group, to alternately manage that incomplete group print job;

a transfer program module for transferring the incomplete group print job, detected by said incomplete job detection program module to the alternate client apparatus determined by said alternate apparatus determination program module; and an end program module for executing the operation end process after completion of the transfer of the incomplete group print job.

* * * * *

UNITED STATES PATENT AND TRADEMARK OFFICE
CERTIFICATE OF CORRECTION

PATENT NO. : 7,382,477 B2
APPLICATION NO. : 10/095027
DATED : June 3, 2008
INVENTOR(S) : Koichiro Wanda It is certified that error appears in the above-identified patent and that said Letters Patent is hereby corrected as shown below:

ON THE TITLE PAGE:
    Title, Item (54) "PRINT JOB" should read -- GROUP PRINT JOB --.

COLUMN 1:
    Line 2, "PRINT JOB" should read -- GROUP PRINT JOB --.

COLUMN 11:
    Line 37, "Interface)" should read -- Interface), --.

COLUMN 12:
    Line 40, "on an" should read -- on a --; and
    Line 41, "of which" should read -- which --.

COLUMN 13:
    Line 12, "alter." should read -- later. --.

COLUMN 16:
    Line 52, "inquires" should read -- inquiries of --.

COLUMN 18:
    Line 20, "tot he" should read -- to the --.

COLUMN 22:
    Line 3, "delete" should read -- deletes --; and
    Line 56, "a given" should read -- a given job --.

COLUMN 23:
    Line 51, "job" should read -- jobs --.

COLUMN 25:
    Line 54, "clients" should read -- client --.

COLUMN 27:
    Line 32, "more" should read -- further --.

UNITED STATES PATENT AND TRADEMARK OFFICE
CERTIFICATE OF CORRECTION

PATENT NO.         : 7,382,477 B2
APPLICATION NO.    : 10/095027
DATED              : June 3, 2008
INVENTOR(S)        : Koichiro Wanda It is certified that error appears in the above-identified patent and that said Letters Patent is hereby corrected as shown below:

<u>COLUMN 29</u>:
Line 44, "more" should read -- further --.

Signed and Sealed this

Twenty-third Day of December, 2008

JON W. DUDAS
*Director of the United States Patent and Trademark Office*